United States Patent [19]

Clausen et al.

[11] Patent Number: 5,511,444
[45] Date of Patent: Apr. 30, 1996

[54] SHOCK-ABSORBING BICYCLE HANDLEBAR ASSEMBLY

[75] Inventors: Eivind Clausen; James D. Allsop, both of Bellingham, Wash.

[73] Assignee: Softride, Inc., Bellingham, Wash.

[21] Appl. No.: 196,868

[22] Filed: Feb. 14, 1994

Related U.S. Application Data

[63] Continuation-in-part of Ser. No. 45,984, Apr. 9, 1993, Pat. No. 5,285,697, which is a continuation-in-part of Ser. No. 982,229, Nov. 25, 1992, Pat. No. 5,253,544, which is a continuation of Ser. No. 760,621, Sep. 19, 1991, abandoned, which is a continuation-in-part of Ser. No. 648,173, Jan. 30, 1991, abandoned.

[51] Int. Cl.$^6$ .................................................. B62K 21/14
[52] U.S. Cl. ........................ 74/551.2; 74/551.1; 280/276; 403/120
[58] Field of Search ........................... 403/120, 145, 403/146, 221; 74/551.1–551.8, 502.2, 489; 280/279

[56] References Cited

U.S. PATENT DOCUMENTS

| | | | |
|---|---|---|---|
| 367,368 | 8/1887 | Copeland | 74/551.2 |
| 402,143 | 4/1889 | Colling | 74/551.2 |
| 423,249 | 3/1890 | Hendee | 74/551.2 |
| 626,602 | 6/1890 | Fenton | 74/551.2 |
| 897,579 | 9/1908 | Brannan | 74/551.2 |
| 1,051,773 | 1/1913 | Stevens | 74/551.2 |
| 1,060,442 | 4/1913 | Erickson | 74/551.2 |
| 1,211,303 | 1/1917 | Eckel | 74/551.2 |
| 1,719,007 | 7/1929 | Gazda | 74/551.2 |
| 2,324,403 | 7/1943 | Kuhn | 74/551.2 |
| 3,388,612 | 6/1968 | Oakley et al. | 74/551.2 |
| 4,600,207 | 7/1986 | Zosi | 280/279 |
| 4,726,600 | 2/1988 | Wu | 74/551.1 X |
| 5,082,302 | 1/1992 | Nacar | 74/557 |
| 5,138,900 | 8/1992 | Hals | 74/551.1 X |
| 5,186,074 | 2/1993 | Arnold | 74/551.1 X |
| 5,220,851 | 6/1993 | Flechel | 74/551.2 |
| 5,253,544 | 10/1993 | Allsop et al. | 74/551.1 |
| 5,285,697 | 2/1994 | Clausen | 74/551.1 |
| 5,287,765 | 2/1994 | Scura | 74/489 X |
| 5,385,070 | 1/1995 | Tseng | 74/502.2 |

FOREIGN PATENT DOCUMENTS

| | | | |
|---|---|---|---|
| 67343 | 8/1948 | Denmark . | |
| 0235040A2 | 9/1987 | European Pat. Off. . | |
| 364759 | 3/1906 | France . | |
| 428563 | 3/1911 | France | 74/551.2 |
| 482523 | 8/1916 | France . | |
| 633091 | 1/1928 | France . | |
| 641997 | 8/1928 | France . | |
| 1050197 | 2/1952 | France . | |
| 1064402 | 10/1952 | France . | |
| 2265604 | 10/1975 | France . | |
| 169701 | 2/1905 | Germany | 74/551.2 |
| 666499 | 10/1938 | Germany . | |

(List continued on next page.)

OTHER PUBLICATIONS

Allsop Handlebar Drawings (9 sheets).

*Primary Examiner*—Vinh T. Luong
*Attorney, Agent, or Firm*—Christensen O'Connor Johnson & Kindness

[57] ABSTRACT

A bicycle handlebar assembly (25) for damping and reducing the shock to which a cyclist is normally exposed. The assembly includes a mounting block (256) attached to the head (12) of a bicycle front fork assembly. An upper linkage member (252) and a lower linkage member (254) that are parallel and spaced apart from each other are pivotally attached at their tail ends to the mounting block. A handlebar claim (258) for securing a set of handlebars (24) thereto is pivotally attached to the front ends of the upper and lower linkage members. The static angle of the linkage members may be adjusted by movement of an eccentric bearing pin. A damping element is disposed against one of the linkage members for slowing the downward movement of the linkage members and serving as a sink for a downward force applied to the linkage members when the handlebars are urged downward. A spring element (268) may be the damping member.

13 Claims, 26 Drawing Sheets

FOREIGN PATENT DOCUMENTS

| | | |
|---|---|---|
| 399794 | 11/1942 | Italy . |
| 444593 | 5/1948 | Italy . |
| 448852 | 3/1949 | Italy . |
| 713755 | 5/1980 | U.S.S.R. . |
| 3707 | 2/1897 | United Kingdom . |
| 281209 | 12/1927 | United Kingdom . |
| 578161 | 6/1946 | United Kingdom . |
| 717377 | 10/1954 | United Kingdom . |
| 9003302 | 4/1990 | WIPO . |

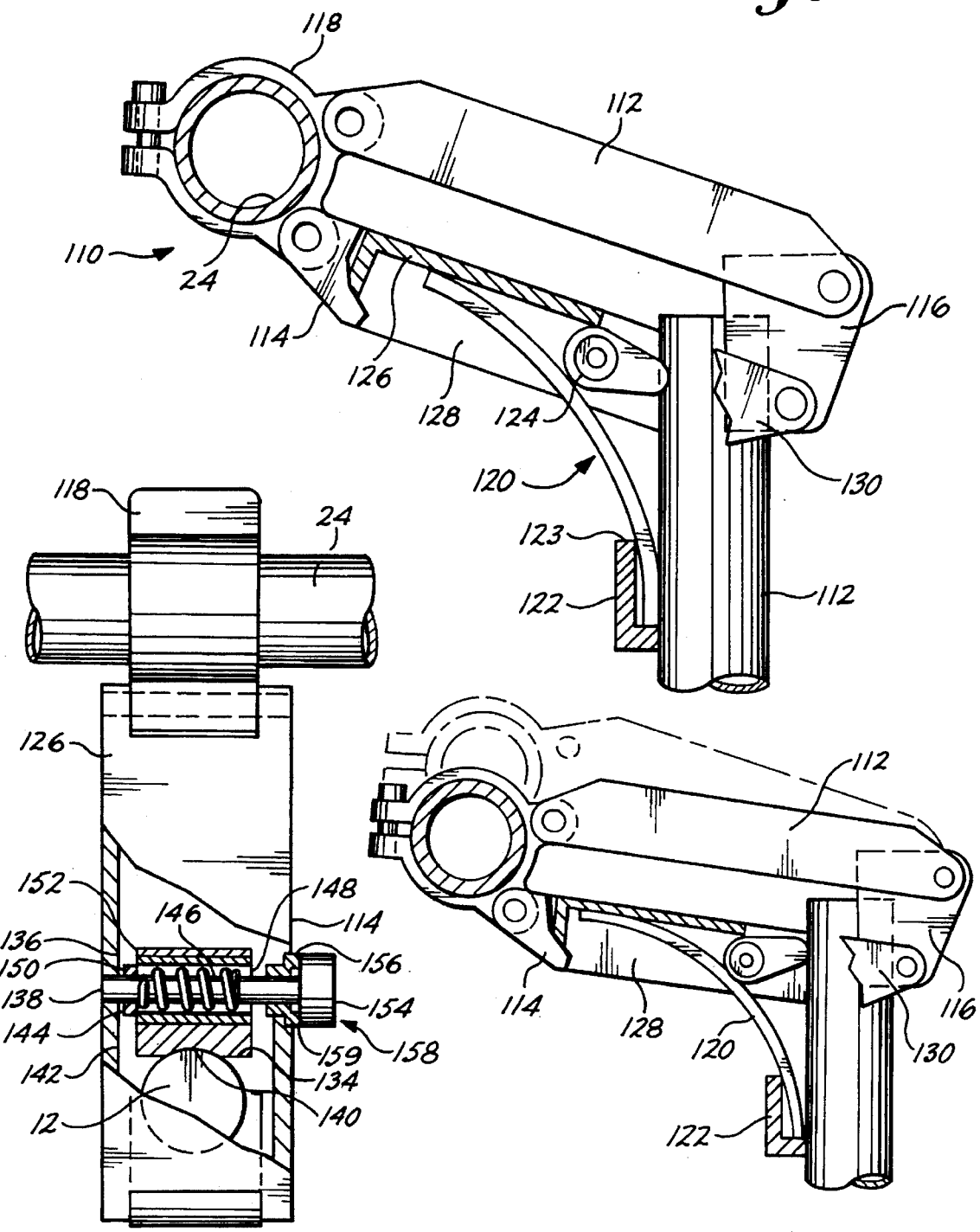

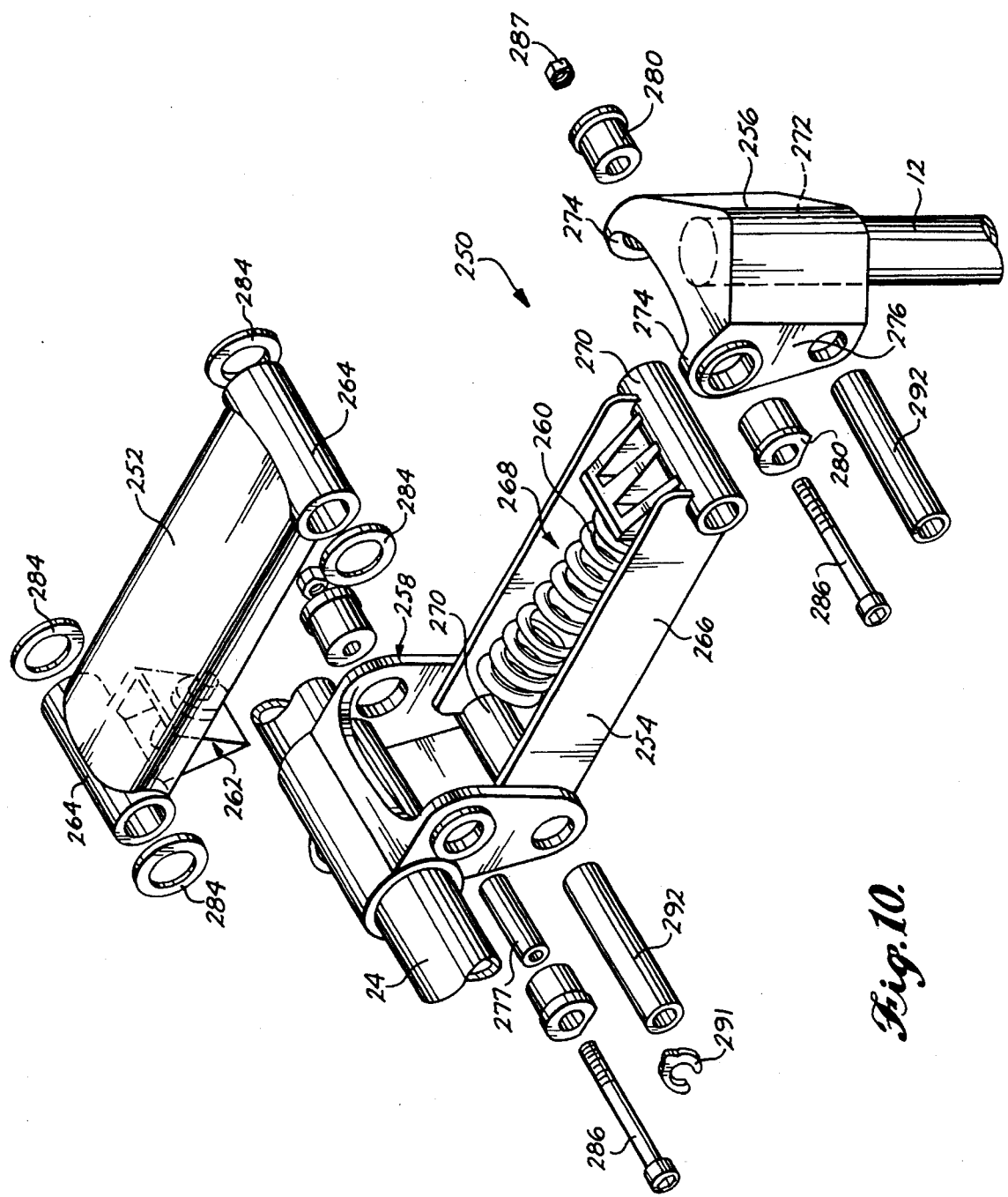

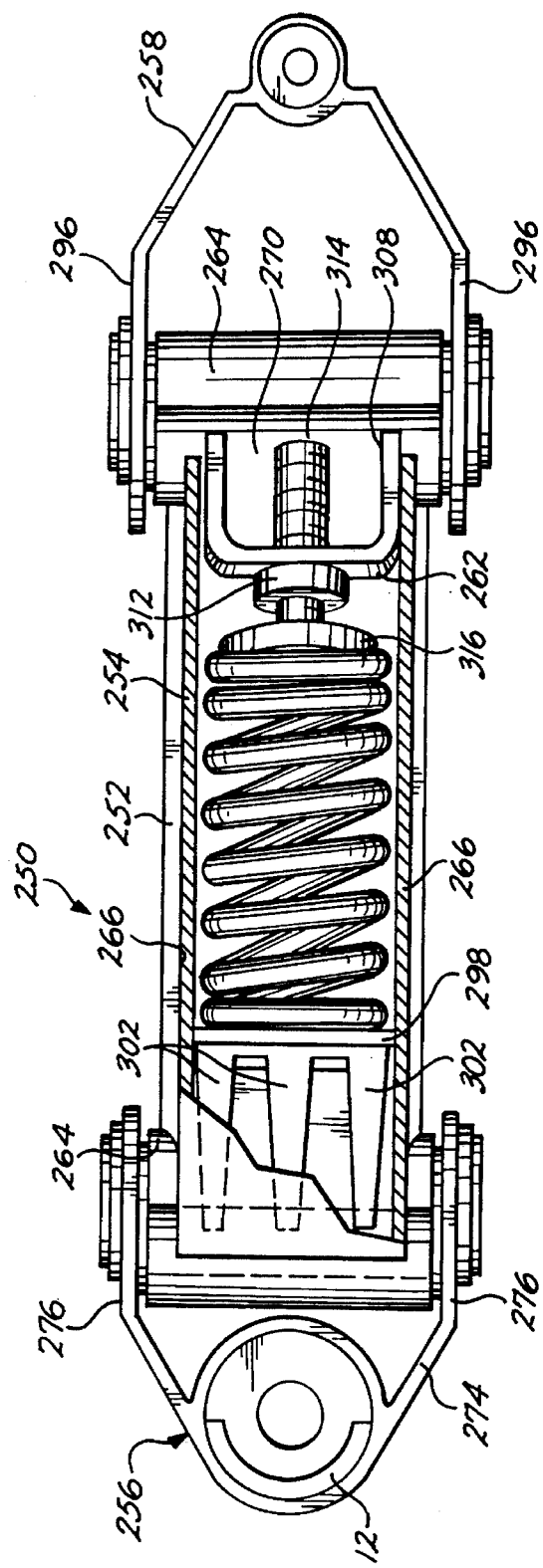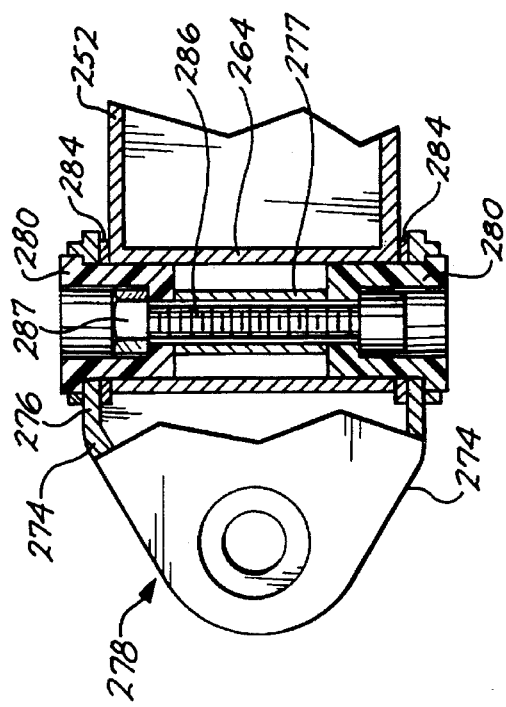

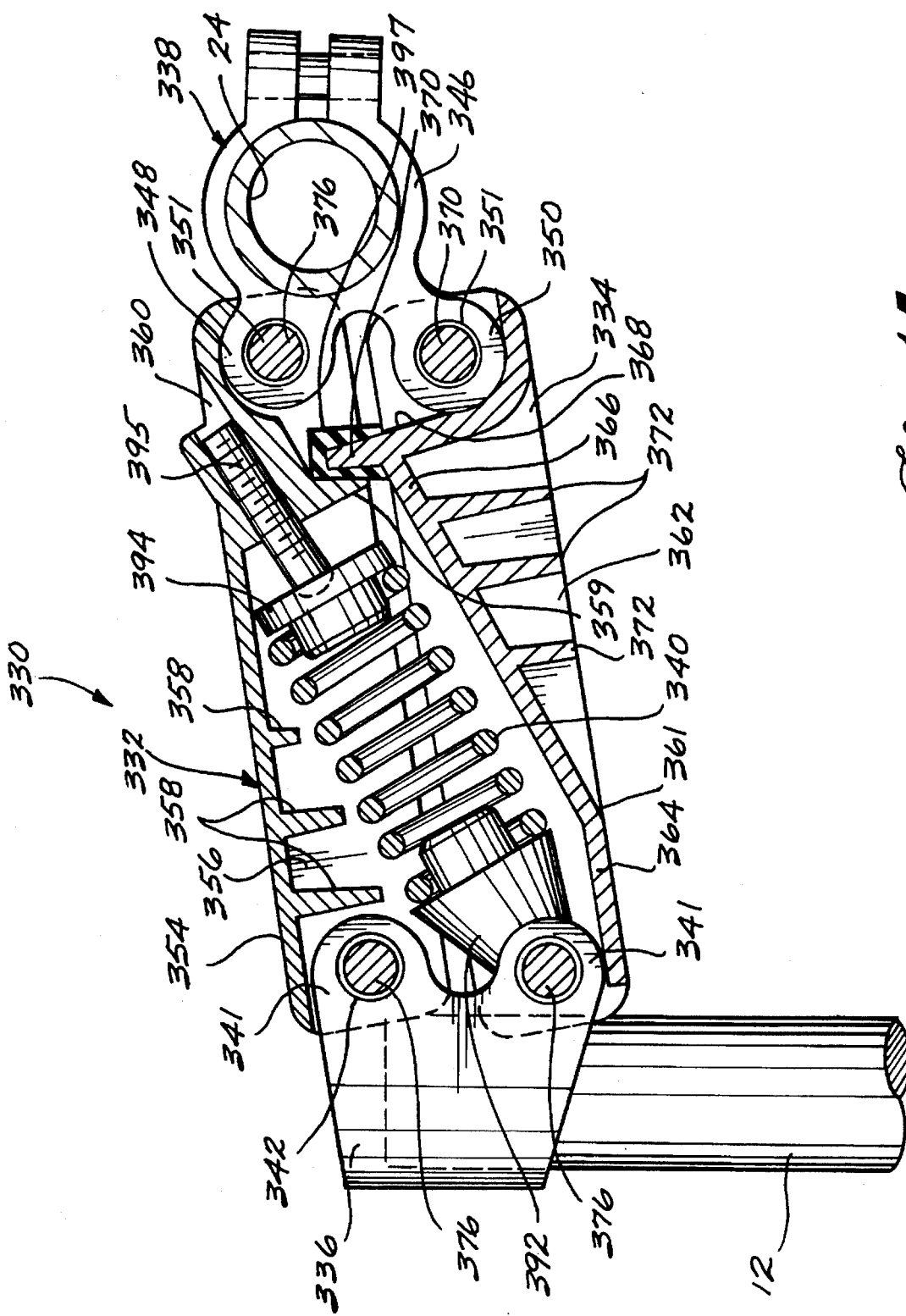

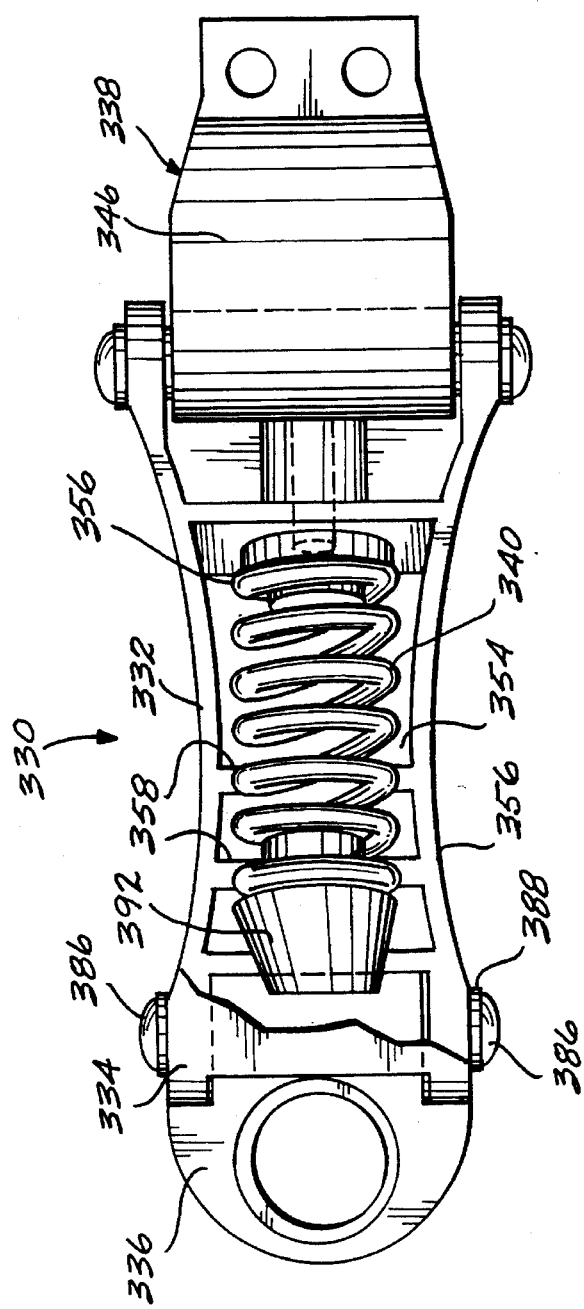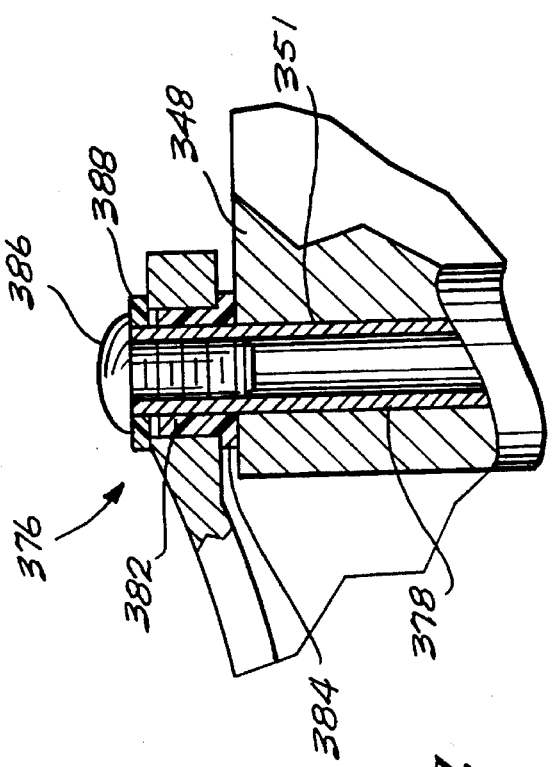
Fig. 16.
Fig. 17.

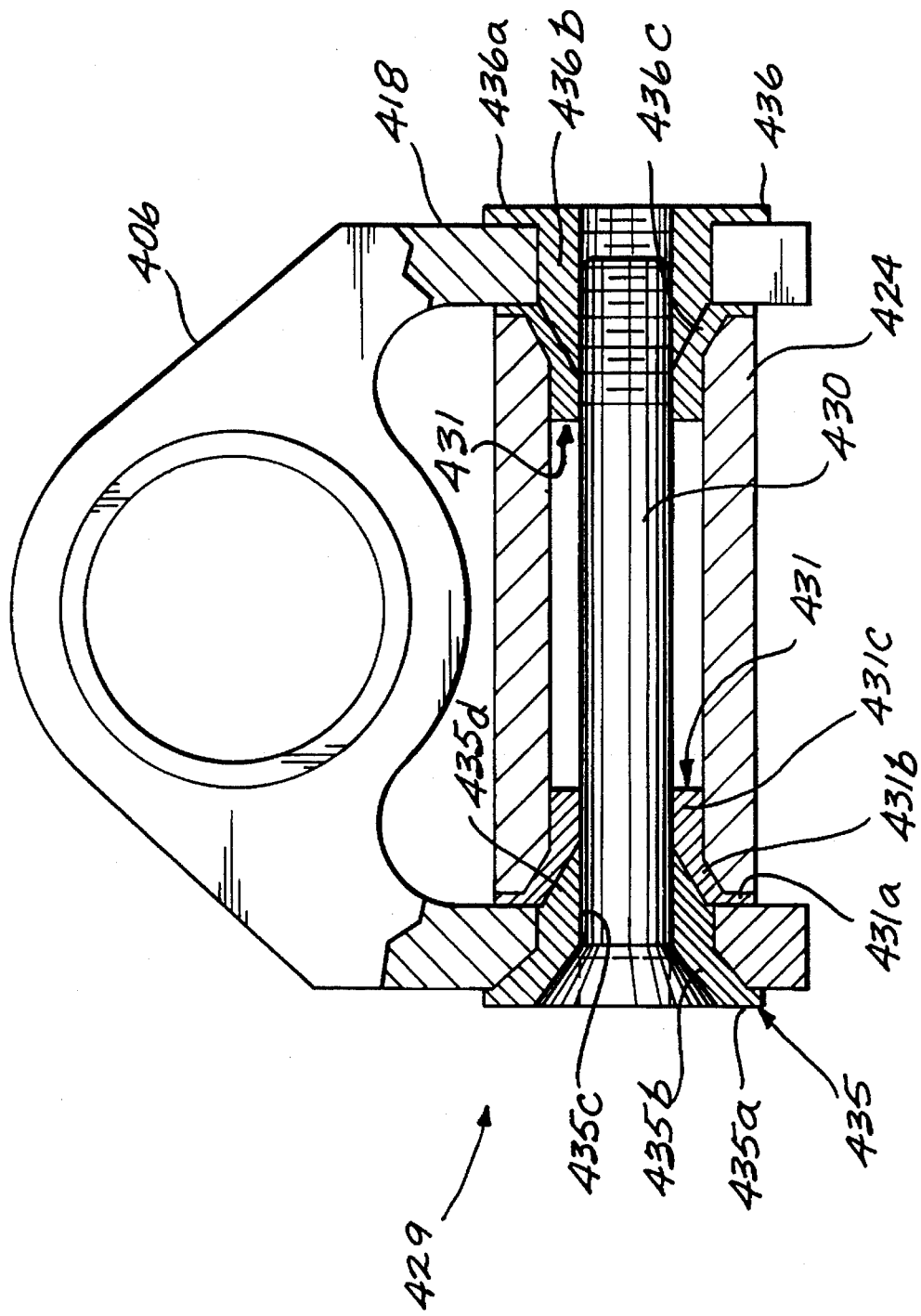

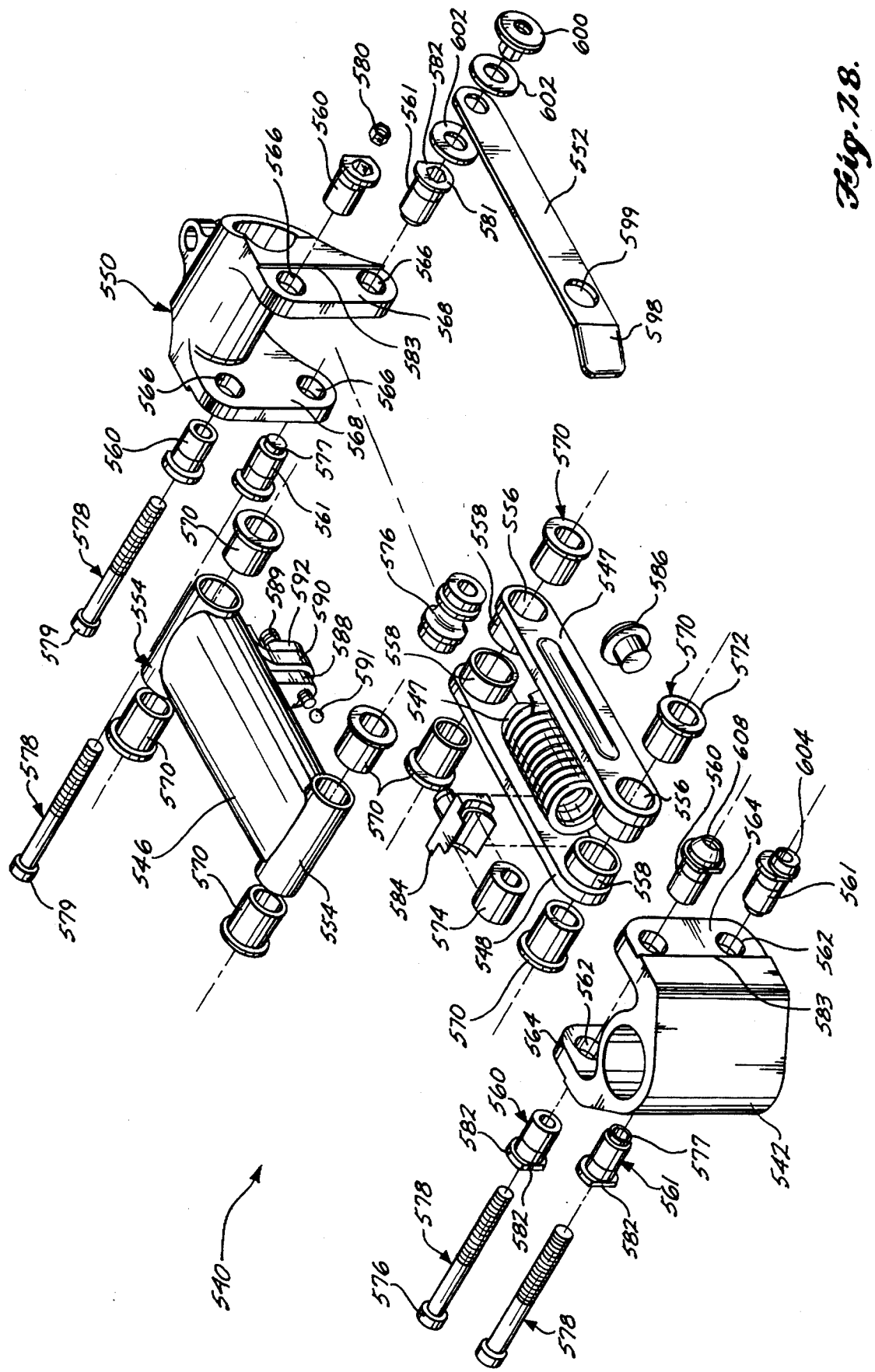

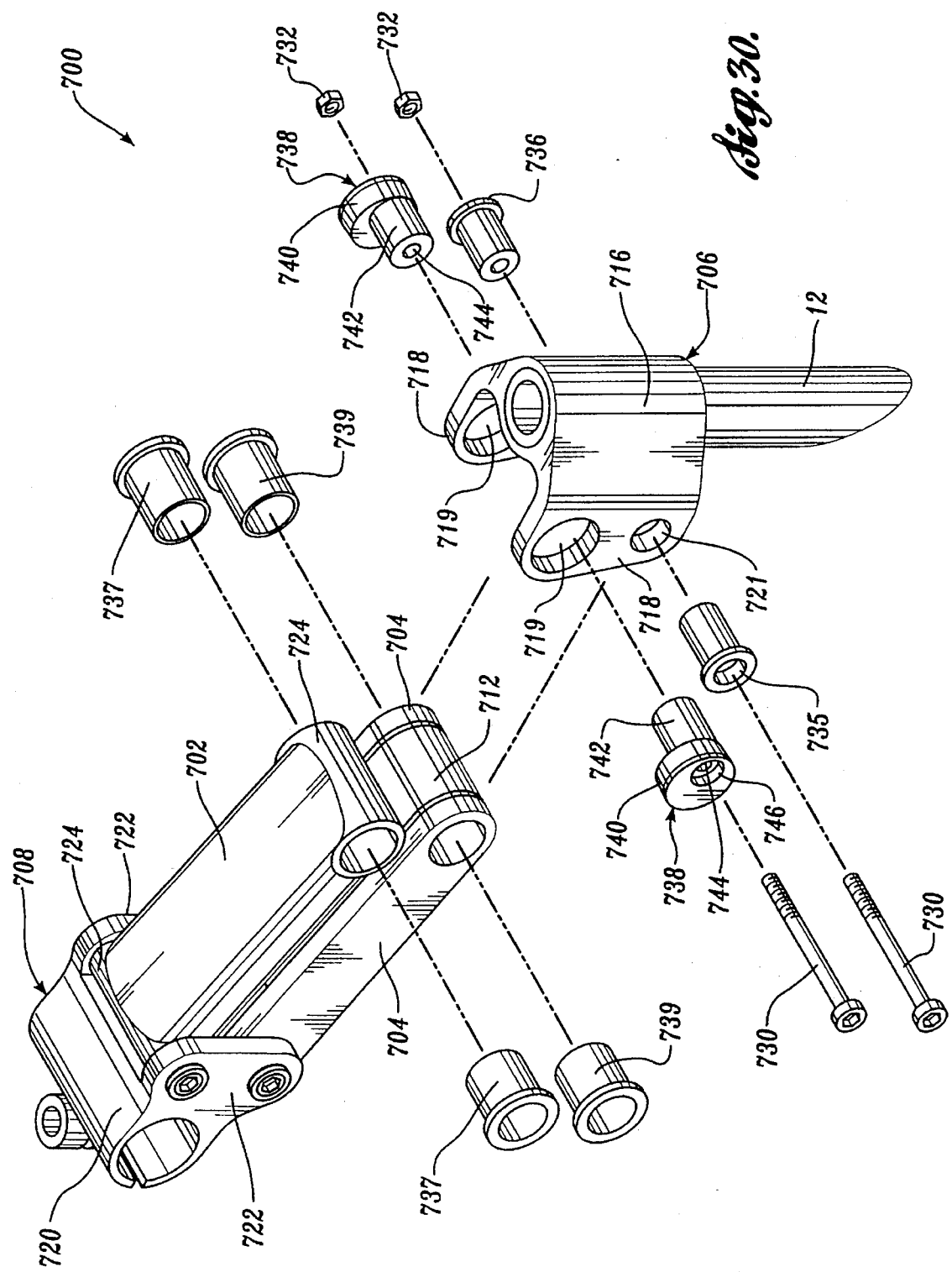

SHOCK-ABSORBING BICYCLE HANDLEBAR ASSEMBLY

RELATIONSHIP TO OTHER APPLICATIONS

This application is a continuation-in-part of U.S. patent application Ser. No. 08/045,984, filed Apr. 9, 1993, now U.S. Pat. No. 5,285,697, which in turn was a continuation-in-part of U.S. patent application Ser. No. 07/982,229 filed Nov. 25, 1992, now U.S. Pat. No. 5,253,544. The '229 application was a continuation of application Ser. No. 07/760,621 filed Sep. 19, 1991, now abandoned. The '621 application was a continuation-in-part of application Ser. No. 07/648,173 filed Jan. 30, 1991, now abandoned.

FIELD OF THE INVENTION

This invention relates generally to an assembly for attaching handlebars to a bicycle and, more particularly, to a shock-absorbing handlebar assembly that is capable of absorbing mechanical shock to which a bicyclist is normally exposed.

BACKGROUND OF THE INVENTION

Bicycles have proved to be very efficient vehicles for converting human energy into mechanical energy in order to produce self-propelled motion. Despite their usefulness, many bicycles suffer from one problem that can dampen the enthusiasm of the most ardent cyclist. The problem is that bicycles are not very good shock absorbers. Consequently, many of the bumps and jolts that a bicycle is exposed to are transferred with little reduction in frequency or amplitude to the cyclist. These shocks must then be absorbed by the cyclist's body, which, over time, may not be able to withstand their effects. Shock exposure is of special concern to persons who enjoy either "mountain" or "off-road" bicycling and to persons who enjoy distance bicycling. Mountain and off-road bicyclists are exposed to a significant amount of shock because the surfaces on which they ride are quite uneven and, consequently, many of the terrain bumps are simply passed through the bicycle to the cyclist's limbs. Distance cyclists are subjected to mechanical vibrations, which, while less intense than those to which off-road cyclists are exposed, can over time cause portions of their bodies to ache and become numb.

One part of the bicycle through which vibrations are transferred to the cyclist is the handlebars. In most bicycles, vertical motion caused by the front wheel traveling over bumps or other uneven surfaces is only marginally attenuated by compression of the front tire. As a result, the motion is transferred through the front wheel fork assembly, through the stem of the assembly, through the handlebars attached to the stem, and from there into the hands and arms of the cyclist where it is absorbed by his/her joints. At the least, repeated exposure to this rapid up and down motion can cause parts of one's body to go numb and serves only to detract from the pleasure of cycling. At the worst, this repeated shock can induce individual pain or injury to the point where some individuals simply find it necessary to forgo bicycling.

There have been some attempts to provide shock-absorbing handlebars to minimize vibration transferred from bicycle to cyclist. These assemblies have typically comprised providing a linkage that allows the handlebars to pivot in an arc relative to a point on a line running through the front fork assembly stem. These assemblies have often been provided with some type of compressible member to damp the pivoting motion. A disadvantage of these assemblies is that they expose the cyclist's hands and arms to a downward and rearward pivoting motion that produces a whole new set of strains on the cyclist's body. Also, since almost all cyclists ride with the back portions of their hands facing forward, this inward and downward motion can be uncomfortable for the cyclist. Furthermore, because of these adverse effects of the pivoting motion, many of the assemblies are designed so that they allow the handlebars to have only a limited degree of movement. Consequently, the amount of vibration these assemblies are able to absorb is limited. Moreover, the design of many of these assemblies has made them unsuitable for use with triathlon handlebars and other nonstandard handlebars, which are favored by a growing number of cyclists. These assemblies also do not allow for adjustment of their static rise angle. Thus, the present assemblies have proved to be of little value for reducing the vibrations to which a great number of cyclists are exposed.

SUMMARY OF THE INVENTION

The invention is directed to a new and useful shock-absorbing handlebar assembly for reducing the front fork shock that bicyclists must otherwise endure. The assembly of this invention includes a set of handlebars that are mounted to a bicycle so that they move along a relatively straight path and have a relatively long path of movement so that the assembly, rather than the cyclist, bears the brunt of the mechanical shock.

The assembly of this invention includes a pair of spaced upper and lower linkage members pivotally attached to a mounting block that is secured to the stem of the bicycle front fork assembly. A handlebar clamp for securing a set of handlebars thereto is pivotally attached to the other end of the linkage members. A damping member that is in contact with at least one of the linkage members is provided to resist downward movement of the linkage members. The damping member in most embodiments of the invention also serves to restore the linkage members to their original positions upon the release of the downward force on the handlebars. Stop members, attached to one or both of the linkage members, limit the upward movement of the members and the handlebars.

In some preferred embodiments of this assembly, the damping member comprises one or more elastomeric elements that are disposed between the linkage members. In other preferred embodiments of the invention, springs that are mechanically linked to one or both of the linkage members serve as the damping members.

When a bicycle with this assembly is subjected to front wheel vibration or shock, the cyclist's natural motion will cause him to push down on the handlebars in normal fashion. The linkage members will, in turn, be forced to pivot to cause the handlebar clamp and the handlebar to move downward in a substantially linear path. During the downward motion, the damping member absorbs a portion of the downward force imposed upon the assembly to cushion and slow the downward movement of the handlebars. When the cyclist releases downward force on the handlebars, the damping member urges the linkage members upward so that the assembly returns to its initial position.

The handlebar assembly of this invention absorbs a significant amount of the front-end shock that results from the vertical movement to which a bicycle is regularly exposed. Since the assembly, rather than the cyclist, absorbs the shock, the incidence of the cyclist's hands and arms stiffening from the adverse effect of this motion is reduced.

When this handlebar assembly is exposed to a shock-induced downward motion, the handlebars move in the same general orientation in which the cyclist's hands and arms move. In other words, the assembly allows the cyclist's body to move along the same path that it would naturally move if the assembly were not present. Thus, the assembly serves to attenuate the shock without causing the cyclist any unnatural or uncomfortable movements.

A related advantage of the handlebar assembly of this invention is that, since it allows the cyclist to move in his natural path when exposed to shock, the range over which the handlebars are allowed to travel is relatively long. This allows the assembly to absorb some of the even larger front-end shocks to which mountain and off-road bicyclists are exposed.

Moreover, in some embodiments of the invention the damping member may actually consist of multiple damping elements. For example, there may be two damping springs. Alternatively, there may be a spring and a pair of damping pads or gas shocks. An advantage of these embodiments of the invention is that one of the damping elements can serve to damp the higher frequency "road" vibrations while the other can serve to reduce exposure to low-frequency "bump" vibrations.

Other embodiments of this invention are provided with a lockout arm that can be connected between the upper and lower linkage members to selectively inhibit or block the shock-absorbing capabilities of the handlebar assembly. This feature is useful for cyclists who, during the course of a particular ride, for example, when they are sprinting, may wish to block the shock-absorbing capabilities and import the maximum downward force to the pedals. Then, when the assemblies of shock-absorbing capabilities are desired, the lockout arm can be released to allow the linkage arms to pivot in order to take advantage of the assembly's shock-absorbing capabilities.

In still other embodiments of this invention, the rise angle of the linkage members is adjustable such that the handlebar height can be adjusted. Preferably, the rise angle adjustability is provided by a bearing pin having a pinhead eccentrically attached to a pin cylinder. The pin cylinder is coupled to the upper or lower linkage. By rotating the position of the pinhead within the head unit, the location of the pin cylinder, and also the rise angle, is changed. The pinhead includes a tapered outer surface engaged within a tapered bore in the head unit such that it does not easily rotate when tightened.

Also, the assembly of this invention is both lightweight and compact in size. Furthermore, the design of the assembly and the type of movement to which the handlebars are exposed to allow the assembly to be readily used with triathlon-style and other unusual types of handlebars.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 5 is a side view showing, in partial cross section, a third embodiment of the handlebar assembly of this invention;

FIG. 6 is a plan view, in partial cross section, showing the handlebar assembly of FIG. 5;

FIG. 7 is a side view shown, in partial cross section, depicting how the handlebar assembly of FIG. 5 can be adjusted, wherein one position of the assembly is shown in solid and the other in phantom;

FIG. 10 is an exploded perspective view of an alternative embodiment of this invention;

FIG. 12 is a partial cutaway bottom view of the embodiment of the invention of FIG. 10;

FIGS. 13A and 13B are partial cutaway views of a first fastening assembly used in conjunction with the invention of FIG. 10;

FIG. 15 is a partial cutaway side view of another embodiment of the invention of FIG. 14;

FIG. 16 is a partial cutaway bottom view of the embodiment of the invention of FIG. 14;

FIG. 17 is a partial cutaway view of the fastening assembly used in conjunction with the invention of FIG. 14;

FIG. 18A is a cross-sectional view of the fastening assembly employed in the embodiment of the invention of FIG. 18.

FIG. 28 is an exploded view of the invention of FIG. 26;

FIG. 29 is an alternative version of the lockout arm that can be employed with the shock-absorbing handlebar of FIG. 26;

FIG. 30 is partially exploded isometric view of an alternate embodiment of the invention having an adjustable rise;

DETAILED DESCRIPTION OF THE PREFERRED EMBODIMENT

Figure 1:
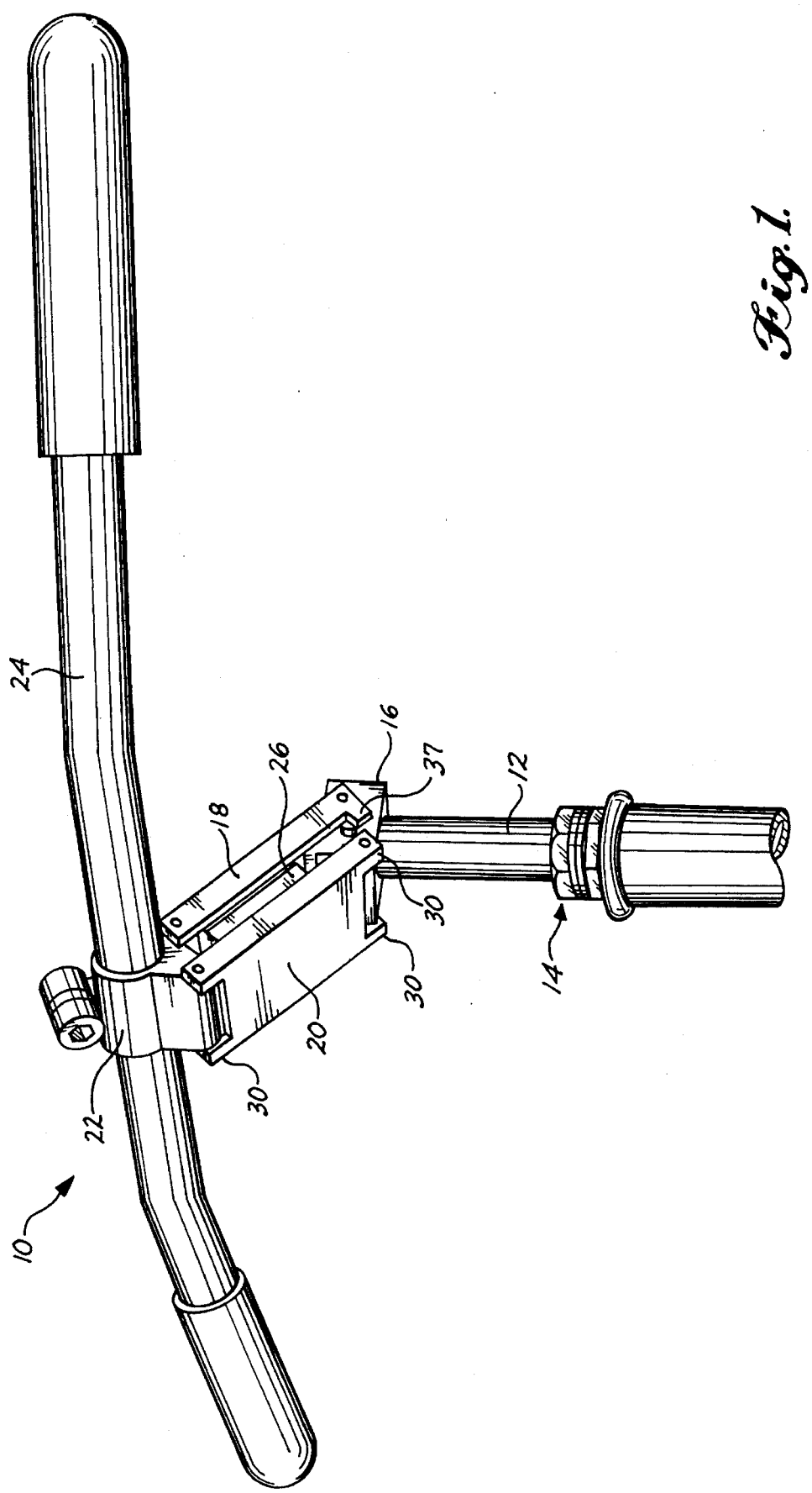
FIG. 1 is a perspective view of a first embodiment of the handlebar assembly constructed in accordance with this invention.

FIG. 1 illustrates a preferred embodiment of the handlebar assembly 10 of this invention mounted to the stem 12 of a bicycle front fork assembly 14. The assembly includes a mounting block 16 that is secured to the head of the front fork assembly stem 12. A pair of upper and lower linkage members 18 and 20, respectively, are pivotally attached at one end to the mounting block 16. The linkage members 18 and 20 are arranged substantially parallel to each other and pivotally attached at their second ends to a handlebar clamp 22 to which handlebars 24 are secured. The linkage members 18 and 20 are spaced apart from each other and an elastomeric block 26 is disposed in the space therebetween.

Figure 2:
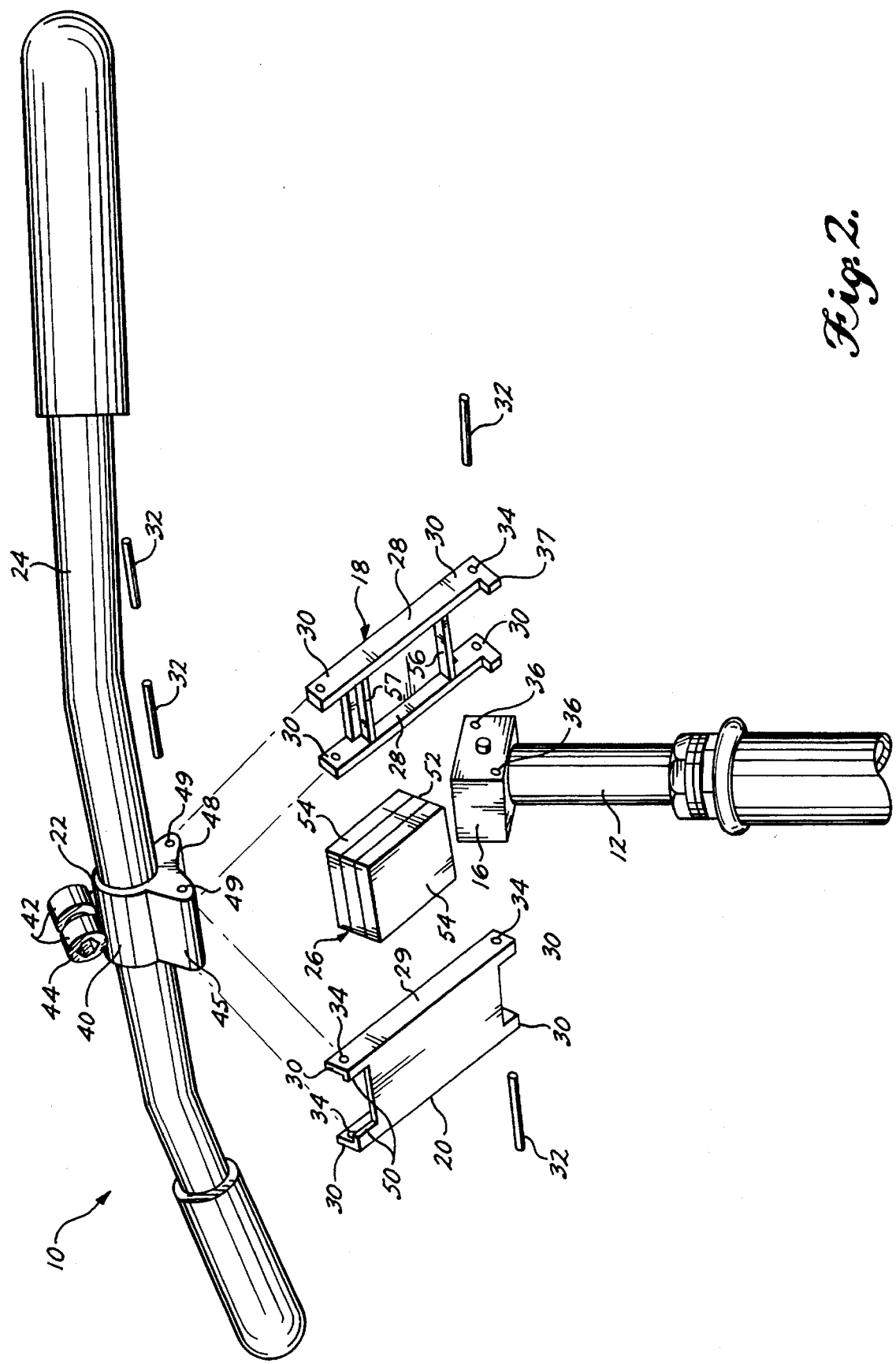
FIG. 2 is an exploded view of the handlebar assembly depicted in FIG. 1.

The handlebar assembly 10 is shown in greater detail in FIG. 2. The mounting block 16 consists of a metal block that is secured to the front fork assembly stem 12. The upper and lower linkage members, 18 and 20, respectively, are generally rectangularly shaped pieces that have perpendicularly extending flanges, 28 and 29, respectively, along their lateral edges. The flanges 28 associated with the upper linkage member 18 extend downward. The flanges 29 associated with the lower linkage member 20 extend upward. Integral with both sets of flanges 28 and 29 are mounting arms 30 that extend longitudinally outward from each of the four corners of the linkage members 18 and 20. The linkage members 18 and 20 are secured to the mounting block 16 by pivot pins 32. The pivot pins 32 extend through openings 34 formed in the mounting arms 30 and openings 36 formed in the mounting block 16.

One of the upper linkage member mounting arms 30 that abuts the mounting block 16 is provided with a downwardly extending tab 37. The tab 37 normally abuts a stop pin 38 that extends outward from the mounting block 16. In a preferred embodiment of the invention, the stop pin 38 is in the form of an adjustable screw, and the head of the screw is in the form of a cam 39, so that the static angle of the assembly 10 relative to the bicycle stem 12 can be selectively set.

The handlebar clamp 22 is in the form of a one-piece structure that has a main body 40 with the basic shape of an elongated split O-ring. A pair of ears 42 formed with axially aligned openings 44 are affixed to the body 40 on either side of the split. The ear openings 44 are dimensioned to accommodate a fastener, not illustrated, that serves to urge the ends of the body 40 together to securely compress the handlebars 24 in the clamp 22. A pair of pillars 48, each with a triangular profile and integral with the body 40, secure the handlebar clamp 22 to the linkage members 18 and 20. Each pillar 48 is disposed between the free mounting arms 30 on the front end of an adjacent linkage member 18 or 20. The pillars 48 are attached to the mounting arms 30 by pivot pins 32, which extend through openings 34 in the mounting arms and openings 49 formed in the ears. Lower linkage member mounting arms 30, to which the handlebar clamp 22 is attached, are each provided with a lip 50 that extends inward perpendicularly from the mounting arm. The lower linkage member mounting arm lips 50 serve to reinforce the mounting arms 30.

Figure 3:
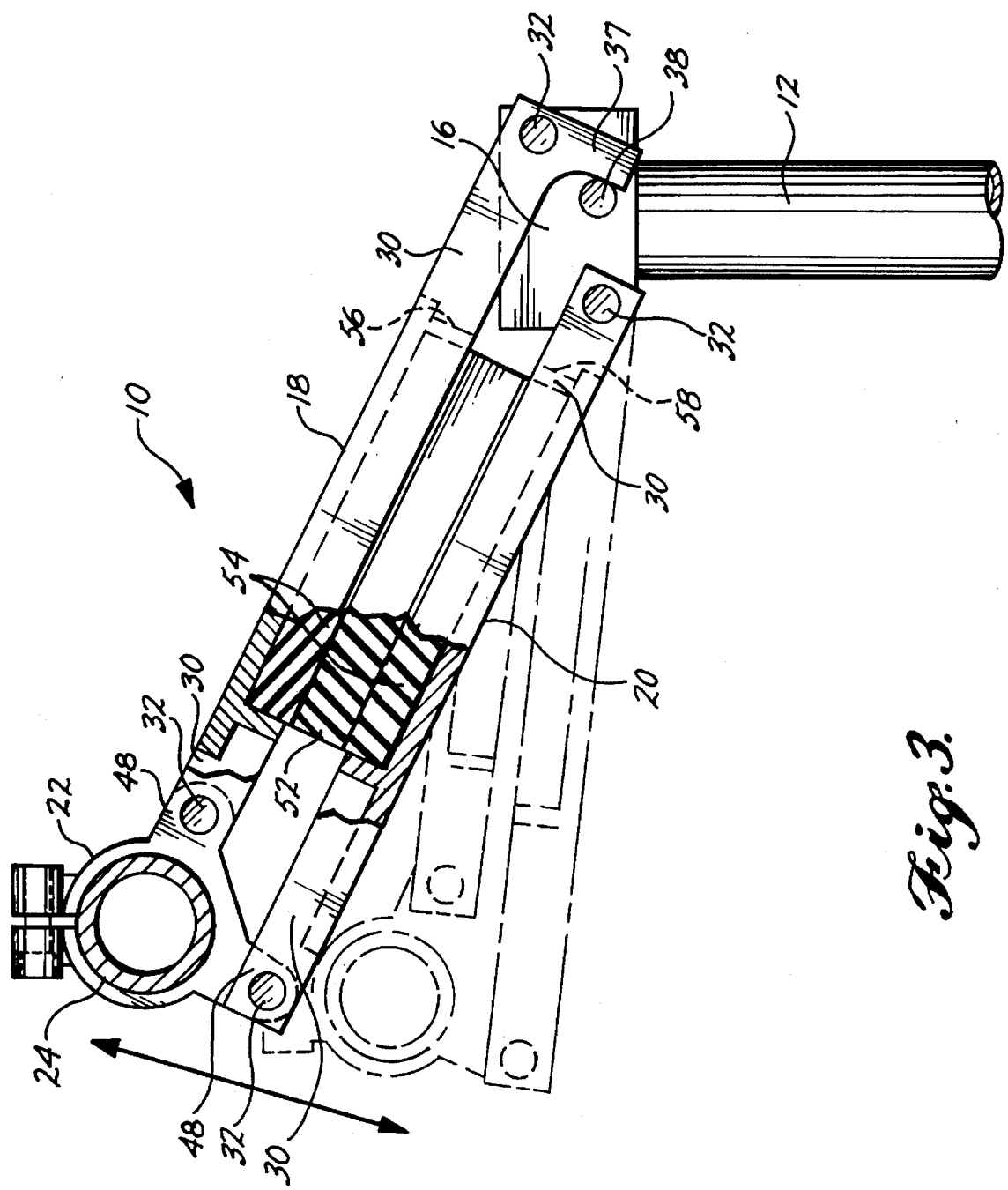
FIG. 3 is a side view, in partial cross section, of the handlebar assembly showing the assembly in a first static position and, in dashed lines, in a downward position.

The elastomeric block 26 comprises a layer of elastomeric material 52 that is sandwiched between two opposed metal plates 54. A suitable elastomeric material 52 that has the appropriate qualities, i.e., is resilient to the effects of both compression and shear, is a low- or medium-durometer polyurethane, such as a polyurethane having a hardness of between approximately 40 to 60 on the Shore Durometer A Scale. The elastomeric layer can have a thickness of between approximately 0.5 to 1.5 inches. The actual thickness will depend on factors such as the location of the pivots and the specific characteristics of the elastomeric material. Epoxy or other suitable adhesive is used to secure the metal plates 54 to the elastomeric material 52. The elastomeric block 26 is secured in place by the linkage member flanges 28 and 29, a pair of ribs 56 that extend downward from upper linkage member 18, and a pair of ribs 58 (shown in phantom in FIG. 3) that extend upward from the lower linkage member 20. The upper linkage member ribs 56 extend between the adjacent upper linkage member flanges 28 and extend only as far downward as the flanges. The lower linkage member ribs 58 similarly extend between the adjacent lower linkage member flanges 29 and extend only as far upward as the flanges.

When a bicycle is provided with the handlebar assembly 10 of this invention, the handlebars 24 are initially in the same position as when they are mounted with a conventional one-piece, static mounting arm. When a cyclist mounts the bicycle there may be some limited downward movement of the assembly 10, as represented by bidirectional arrow 60. The maximum movement of the assembly occurs when the bicycle passes over a bump or other surface roughness that forces the cyclist's upper body downward. When this happens, the cyclist pushes downward on the handlebar 24, which, in turn, causes the linkage members 18 and 20 to pivot downward and to be urged together, as is shown in dashed lines in FIG. 3. When the linkage members 18 and 20 are moved in this manner, each member pivots about the individual pivot point around which it is secured to the mounting block 16. As a result, the handlebar clamp 22 and the handlebars 24 attached thereto travel downward, in an arc of such a wide circumference that, for all intents and purposes, it is essentially a straight path.

During the downward motion of the assembly 10, the elastomeric block 26 remains secured by the linkage member flanges 28 and 29 and the linkage member ribs 56 and 58. Consequently, the elastomeric material 52 is both compressed by the inward movement of the linkage members 18 and 20 and is laterally deformed or sheared. The compression of the elastomeric material 52 serves as a sink for a portion of the downward force the cyclist imposes on the assembly 10 to slow downward movement of the linkage members 18 and 20 and the other elements of the assembly 10. The shearing of the elastomeric material further serves to decelerate the downward motion of the linkage members 18 and 20 to further reduce the shock to which the cyclist is exposed. Also, during this movement of the assembly 10, the upper linkage member mounting arm tab 37 is pivoted rearward away from the stop pin 38.

When the cyclist's upper body returns to its initial position, the downward force on the assembly 10 is released. The resilient properties of the elastomeric material 52 cause it to return to its initial shape so that, in turn, the linkage members 18 and 20 are urged upward. The upward motion of the linkage members 18 and 20 is then stopped by the upper linkage member tab 37 when it abuts the stop pin 38. The upward motion itself is actually damped by a portion of the return energy, which is absorbed by the elastomeric material 52 as it recovers from the shear state to its initial state. The absorption of this energy serves to damp the rate at which the assembly 10 returns to the initial, static, state.

The handlebar assembly 10 of this invention serves to absorb a significant portion of the front-end shock to which a cyclist would be exposed. Whenever bumps or other surface discontinuities cause the cyclist's upper body to be pressed downward, the linkage members 18 and 20 are forced downward. A portion of the downward force the cyclist imparts is then absorbed by the compression and lateral deformation of the elastomeric material 52. Thus, the downward movement of the linkage members 18 and 20 and the compression and deformation of the elastomeric material 52 serve to absorb a sizable portion of the mechanical shock that would otherwise be absorbed by the cyclist's upper body.

Another advantage of the handlebar assembly 10 of this invention is that the parallel linkage members 18 and 20 move in a substantially linear and diagonal downward path when a force is imposed thereon. This movement is in line with the natural movement of the cyclist as his hands and arms travel downward. Furthermore, this movement does not cause the handlebars themselves to pivot inward. In other words, as the handlebars 24 move downward, they do not rotate in the cyclist's hands. Thus, the movement of the handlebar assembly 10, including the handlebars 24, is consistent with the natural movement of the cyclist so it does not impose any discomfort on the cyclist.

Furthermore, since the movement of the handlebar assembly 10 does not impose any discomfort on the cyclist, the assembly is able to have a relatively long path of movement. This allows the assembly 10 to move downward, and to continue to absorb shock even when large bumps force the cyclist into relatively large downward movements. This further enhances the ability of the assembly 10 to absorb shock that the cyclist would otherwise feel.

Another feature of this invention is that the upper linkage member tab 37 and the stop pin 38 cooperate to prevent the assembly 10 from moving upward beyond a certain, selected angle. This prevents the assembly 10 from pivoting upward to the point where the linkage members 28 and 29 meet. Consequently, when a cyclist pulls up on the handlebars 24, as frequently happens when one pedals uphill, the assembly 10 limits the upward movement of the handlebars. This allows the cyclist to press off against the handlebars 24 to increase the mount of power that is applied to the pedals. Moreover, the movement-stopping effect of the tab 37 and pin 38 prevents an excessive spring-back from handlebars 24, which could otherwise further fatigue the cyclist's upper body.

Moreover, since the assembly 10 does not pivot inward significantly, it is well suited for use with triathlon handlebars and other nonstandard handlebars that require the cyclist to ride with hands and arms outstretched.

Figure 4:
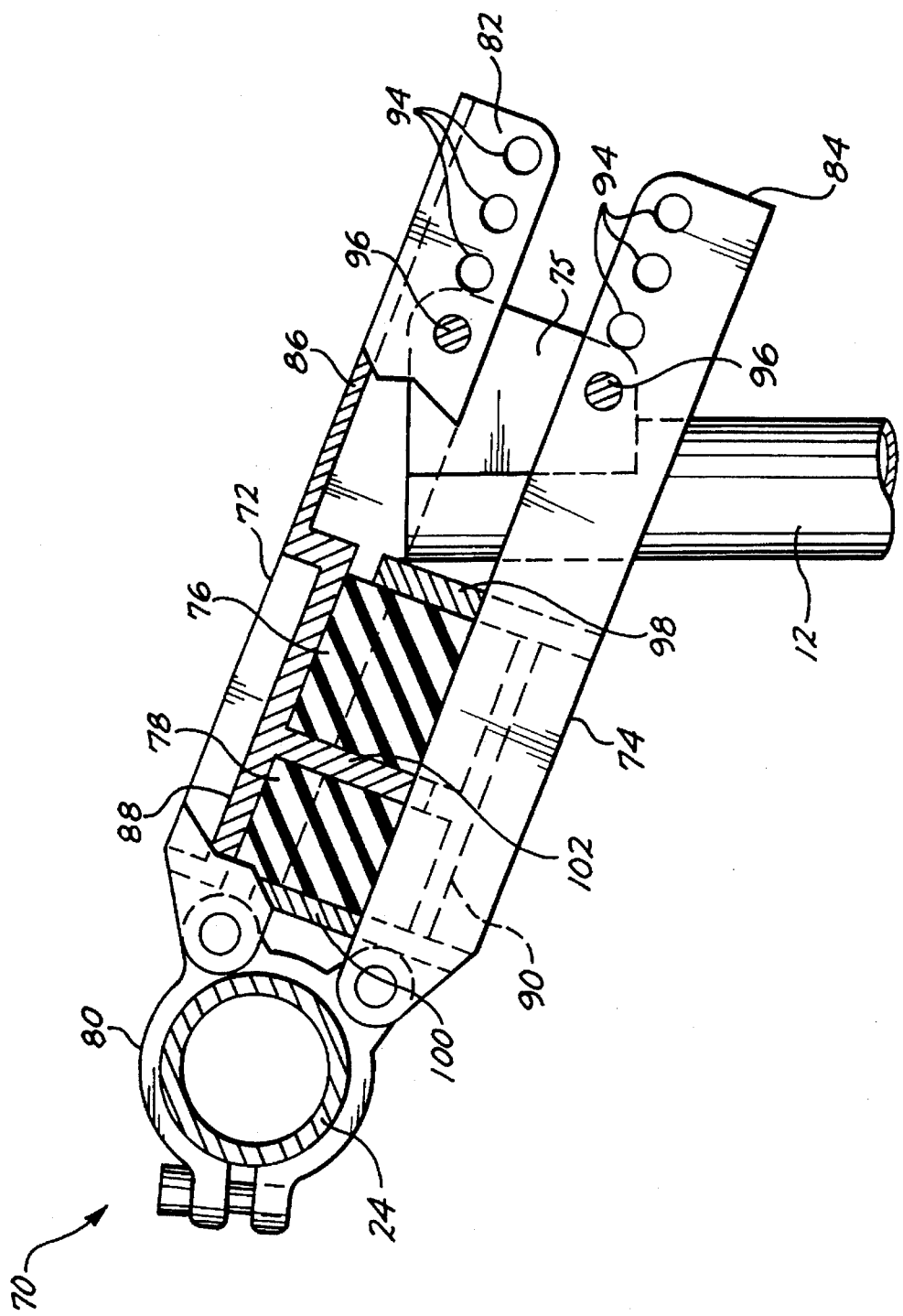
FIG. 4 is a side view, in partial cross section, showing an alternative embodiment of the handlebar assembly of this invention.

FIG. 4 illustrates an alternative handlebar assembly 70 constructed according to this invention. The assembly 70 includes an upper linkage member and lower linkage member, 72 and 74, respectively, that are pivotally attached to a mounting block 75, which is secured to the head of a bicycle front fork assembly. The assembly 70 includes first and second elastomeric blocks 76 and 78, respectively, that are seated in the space between the upper and lower linkage members 72 and 74. The first elastomeric block 76 serves to damp the downward movement of the assembly 70 when the cyclist pushes down. The second elastomeric block 78 serves to damp and stop the upward movement of the assembly after the cyclist releases the downward force. A handlebar clamp 80 identical to the handlebar clamp 22 of the first embodiment of this invention is used to secure the handlebar 24 to the other elements of assembly 70.

The linkage members 72 and 74 are relatively longer than linkage members 16 and 18 of the first embodiment of the invention. Upper linkage member 72 is formed with a pair of downwardly extending flanges 82 along its lateral edges. Lower linkage member 74 is formed with a pair of upwardly extending flanges 84 along its lateral edges. The upper linkage member 72 is formed with a first base plate 86 at its tail end and a second base plate 88 that is stepped down from the first base plate 86. The lower linkage member 74 is formed with a base plate 90, shown in phantom, that is relatively shorter than the adjacent flanges 84 so that the flanges extend rearward from the base plate. Elastomeric blocks 76 and 78 are seated between upper linkage member second base plate 88 and lower linkage member base plate 90.

Each linkage member flanges 82 and 84 is formed with a set of openings 94 to facilitate mounting the linkage members 72 and 74 to the mounting block 75 with pivot pins 96. The multiple openings 94 allow the adjustable mounting of the assembly 10 to the bicycle so that the cyclist can select how much forward of the front fork the handlebars 24 are located. When this assembly 10 is mounted on the bicycle, the mounting block 75 and head of the front fork assembly are located in the space between the lower linkage member flanges 84.

The lower linkage member 74 is formed with a first upwardly extending tongue 98 adjacent the tail edge of the base plate 90 and a second upwardly extending tongue 100 adjacent the leading edge of the base plate. The upper linkage member 72 has a downwardly extending tongue 102 that is located in approximately the middle of the second plate 88. The lower linkage member first tongue 98 and the upper linkage member tongue 102, in combination with the adjacent linkage member base plates 88 and 90, define the space in which the first elastomeric block 76 is seated. The lower linkage member second tongue 100 and the upper linkage member tongue 102, in combination with the adjacent linkage member base plates 88 and 90, define the space in which the second elastomeric block is seated. The linkage member tongues are dimensioned so that the lower linkage tongues 98 and 100 partially overlap the upper member linkage tongue 102. The linkage member tongues are further dimensioned so that the tips of the lower linkage member tongues 98 and 100 are spaced from the adjacent upper linkage member plate 88 and the upper linkage member tongue 102 is spaced from the lower linkage member base plate 90. The spacing is such that, when a downward force is imposed on the assembly 10 and the linkage members 72 and 74 are urged together, the lower linkage member tongues 98 and 100 remain separated from the upper linkage base plate 88 and the upper linkage member remains separated from the lower linkage base plate 90.

The linkage member tongues are spaced from each other so that when the assembly 10 is in a static position, the lower linkage member second tongue 100 and the upper linkage member tongue 102 compress or preload the second elastomeric block 78, while the lower linkage member first tongue 98 and the upper linkage member tongue do not impose a similar load on the first elastomeric block 76.

When a bicycle equipped with handlebar assembly 70 is exposed to a front-end shock, the upper body of the cyclist will be forced downward in the usual manner. The hands and arms of the cyclist will press downward on the handlebars 24 so as to causing the linkage members 72 and 74 to pivot downward. As the linkage members 72 and 74 pivot, the lower linkage member first tongue 98 moves toward the upper linkage member tongue 102 to compress the first elastomeric block 76 therebetween. Simultaneously, the lower linkage member second tongue 100 moves away from the upper linkage member tongue 102 so that the static compressive force on the second elastomeric block 78 is reduced. After the cyclist releases the downward force on the assembly 70, the resilient qualities of the first elastomeric block 76 cause it to expand, which, in turn, causes the assembly 70 to pivot upward. As the upper and lower linkage members, 72 and 74, respectively, pivot upward, the lower linkage member second tongue 100 and the upper linkage member tongue 102 move toward each other and recompress the second elastomeric block 78. This recompression of the second elastomeric block 78 serves to first slow and then stop the upward motion of the assembly 70 so that the assembly returns to its initial position.

The handlebar assembly 70 of this embodiment of the invention serves to reduce the shock to which a cyclist is exposed much like the assembly 10 of the first embodiment. During the downward movement of the assembly 70, the compression of the first elastomeric block 76 damps and absorbs much of the mechanical shock that would otherwise be transferred to the hands and arms of the cyclist. During the upward movement of the assembly 70, the recompression of the second elastomeric block 76 slows the movement of the linkage members 72 and 74 so that the cyclist is not exposed to any jolting motion during the return movement of the assembly 70.

FIGS. 5–7 illustrate another handlebar assembly 110 of this invention. This assembly 110 includes an upper linkage member and a lower linkage member, 112 and 114, respectively, that are pivotally attached to a mounting block 116 secured to the head of the bicycle front fork assembly stem 12. A handlebar clamp 118, similar to the handlebar clamp 22 (FIG. 1) of the first described embodiment of this invention, is pivotally attached to the front ends of the linkage members 112 and 114 and is used to secure the handlebars 24 to the assembly 110. A leaf spring 120, one end of which is mounted in a holder 122 attached to the stem of the front fork assembly, serves to damp and absorb the downward motion of the handlebars 24 and the linkage members 112 and 114. An adjustable lug assembly 124 controls the static position of the linkage members 112 and 114 and stops the upward movement of the assembly 110.

The upper linkage member 112 is substantially identical in size and shape to the upper linkage member 18 of the first embodiment of the invention (FIG. 1). The lower linkage member 114 has a base plate 126, located forward of the bicycle front fork assembly, and a pair of flanges 128 that extend perpendicularly downward from the lateral edges of the base plate. The lower linkage member flanges 128 extend beyond the tail end of the base plate 126 to function as mounting arms 130 that are pivotally secured to the mounting block 116.

The holder 122 in which the leaf spring 120 is secured has a rectangular cross section and is secured to an exposed section of the bicycle front fork assembly above the frame head tube by a metal strap or other fastening member (fastening member not shown). The holder 122 is formed with a top opening 123 from which the leaf spring 120 extends. In some preferred embodiments of the invention, one or more threaded fasteners, not shown, may be used to secure the leaf spring 120 to the housing.

The leaf spring 120 is a single flexible band of metal. The metal forming the leaf spring may be wholly or partially covered with a plastic, such as Teflon, or material to inhibit corrosion and to reduce friction along the lower linkage member/spring interface. The leaf spring 120 extends up from the holder 122 and curves forward so that the end of the spring is disposed against the undersurface of the lower linkage member base plate 126.

Lug assembly 124 includes a finger 134 that is mounted to a plastic cylinder 136 that, in turn, is affixed to a rotatable pin 138 mounted between the lower linkage member flanges 128 and the head of the front fork assembly. Finger 134 is formed of reinforced rubber or material with similar resilient qualities and is relatively thick where fitted over the cylinder 136 and tapers to a relatively thin width at the end distal therefrom. The distal end of the finger is formed with a concave indentation 140 that conforms to the outer curvature of the adjacent front fork assembly stem 12. The finger 134 is further formed with an opening 142 in which the cylinder 136 is secured by an adhesive.

The cylinder 136 is formed with an axially extending bore 144 in which the pin 138 is disposed. The bore 144 is dimensioned so that a coil spring 146 can be disposed therein around the pin 138. One end of the cylinder 136 is provided with an inwardly directed annular step 148 that is dimensioned to abut the pin 138. Epoxy or other suitable adhesive may be used to secure the cylinder 136 to the pin 138 around the inside of the step 148. A stop ring 150 is secured to the pin 138 adjacent the end of the cylinder 136 that does not include the step 148. A washer 152 is disposed in the cylinder bore 144 between the end of the spring 146 and the stop ring 150, such that the spring and the washer normally bias the stop ring away from the finger 134 and the cylinder 136.

The section of the pin 138 adjacent the cylinder step 148 is provided with a head 154 adjacent the outer surface of the proximate lower linkage member flange 128. Attached to the pinhead 154 and designed to rotate therewith is a star washer 156 with a set of circumferentially spaced-apart projections 158. The star washer projections 158 are dimensioned to be seated in complementary indentations 159 formed in the outer surface of the lower linkage member flange 128. (Only two projections and complementary indentations are shown.) The action of the spring 146 against the star washer 156 normally urges the star washer projections 158 into the indentations so that the finger is secured in one fixed position.

When a cyclist asserts downward force on handlebars 24 of the assembly 110 of this invention, the upper and lower linkage members 112 and 114, respectively, will pivot downward in a manner similar to the linkage assemblies of the previously described embodiments of the invention. The leaf spring 120, which abuts the outer surface of the lower linkage member base plate 126, resists the downward movement of the linkage members to both slow the downward movement and serve as a sink for the downward force exerted against the assembly 110. As the assembly 110 is urged downward, the lug assembly 124 is rotated away from the bicycle front fork stem such that the finger 134 is spaced away from the stem. When the cyclist stops exerting a downward force against the assembly 110, the action of the leaf spring 120 against the lower linkage member 114 pivots the assembly upward. The upward movement of the assembly 70 is stopped by the action of the lug assembly finger 134 abutting the adjacent outer surface of the front fork stem 12.

The static position of the handlebar assembly 110 can be adjusted by changing the relative setting of the lug assembly finger 134 against the front fork stem. The lug assembly finger 134 setting is changed by pulling out on the lug assembly pinhead 154 so that the star washer 156 is spaced away from the adjacent lower linkage member flange indentations 159. The lug assembly pin 138 is then rotated so that the finger 134 is directed downward. Using hand pressure the cyclist then positions the assembly 110 so that the handlebars 24 are in the desired static position. After the static position of the handlebars 24 is set, the pin 138 is rotated upward until the indentation 140 and the distal end of the finger 134 abut the front fork stem. The pinhead 154 is then released so that the spring 146 urges the star washer projections 158 into the lower linkage member flange indentations 159. As illustrated by the solid and phantom illustrations of the assembly in FIG. 7, this allows the cyclist to adjust the relative height of the handlebars 24 with a minimal amount of effort.

Figure 8:
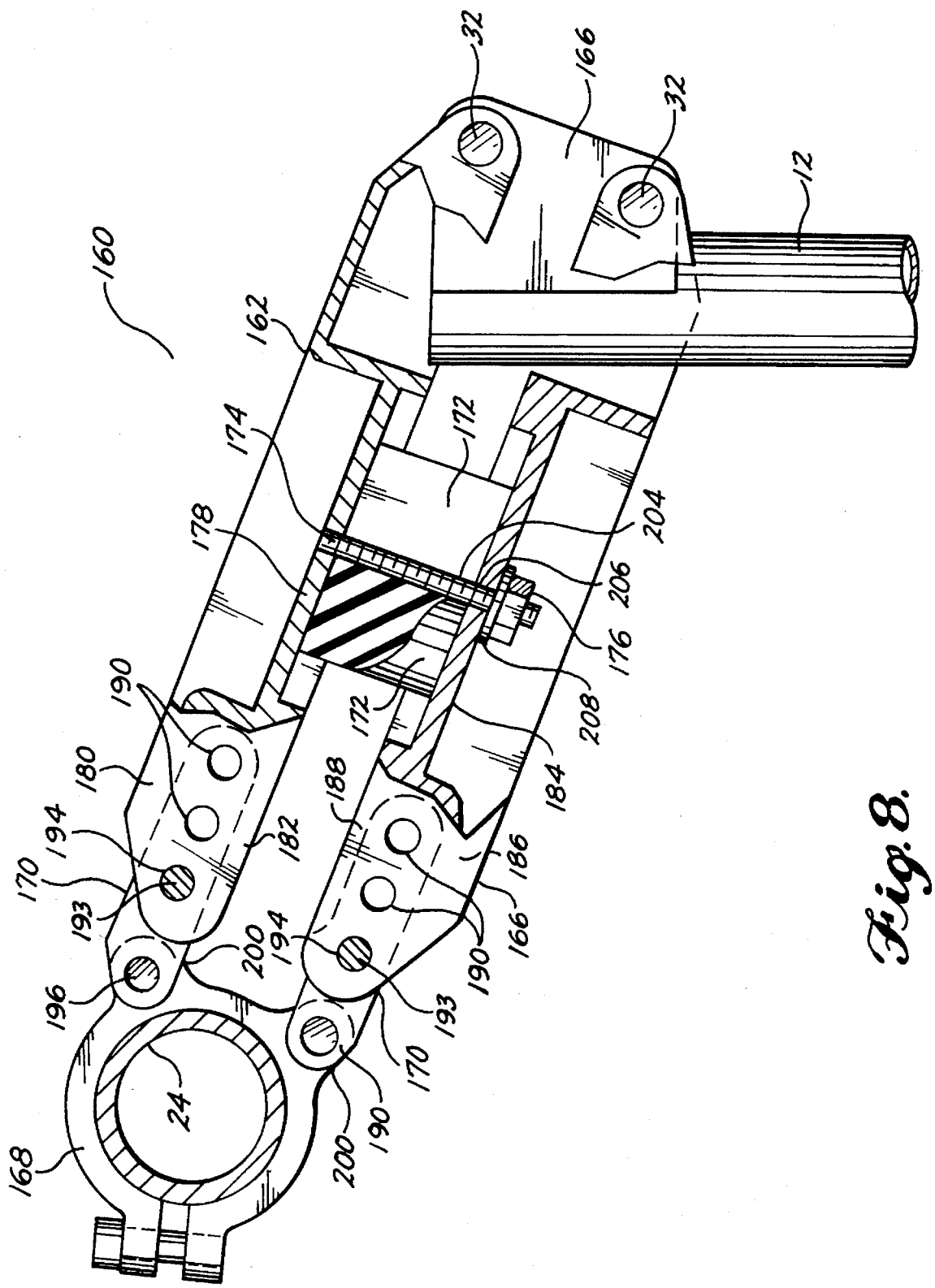
FIG. 8 is a side view illustrating, in partial cross section, a fourth embodiment of the handlebar of this invention.

Another embodiment of a handlebar assembly 160 of this invention is illustrated in FIG. 8. The assembly 160 includes an upper linkage member and a lower linkage member 162 and 164, respectively, that are pivotally mounted at their tail ends to a mounting block 166 attached to the head of the front fork assembly. A handlebar clamp 168 securing handlebars 24 is adjustably attached to the upper and lower linkage members 162 and 164, respectively, by a pair of telescoping slides 170 that are secured to the linkage members. A set of four elastomeric plugs 172 are disposed between the upper and lower linkage members 162 and 164, respectively. A threaded rod 174 extends between the upper linkage member 162 and the lower linkage member 164. The free end of the rod 174 adjacent the lower linkage member is provided with an adjustably positionable catch 176 to limit the upward movement of the assembly 160.

The upper linkage member 162 is formed with a rectangular base plate 178 and a pair of sidewalls 180 that extend perpendicularly along the lateral edges of the base plate 178. Integral with and set below the front end of the upper linkage base plate 178 is a slide plate 182. The upper linkage member sidewalls 180 extend forward of the base plate 178 around and above the lateral edges of the slide plate 182. The lower linkage member 164 is formed with a lower linkage member base plate 184 and a pair of lower linkage member sidewalls 186 that extend laterally along the sides of the base plate. Integral with the lower linkage member base plate 184 and stepped above the base plate is a lower linkage member slide plate 188. The lower linkage member sidewalls 186 extend perpendicularly downward from the lateral edges of the lower linkage member slide plate 188. The upper and lower linkage member sidewalls 180 and 186, respectively, extend rearward from the associated base plates 178 and 184, respectively, to function as upper and lower mounting arms 190 and 192, respectively. The mounting arms 190 and 192 are pivotally attached to the mounting block 166 using the previously described pivot pins.

The slides 170 are disposed against the slide plates such that one slide is positioned on top of the upper linkage member slide plate 182 and the second slide is positioned immediately below the lower linkage member slide plate 188. Slides 170 are generally elongated bodies with semi- circular end sections and are formed with a number of openings 191 such that, in combination with fastening elements 193 and openings 194 formed in the front ends of the linkage member sidewalls 180 and 186, they can be selectively secured to the linkage members in either retracted, partially extended, or fully extended states. Within the front ends of each slide 170 are a pair of spaced-apart mounting tabs 196. The mounting tabs 196 are formed with openings 198 to facilitate pivotal connection of the pillars 200 on the handlebar clamp 168 to the slides by conventional means previously described.

The elastomeric plugs 172 comprise cylindrical plugs of elastomeric material, such as rubber or polyurethane, are approximately 0.5 to 0.75 inch in diameter, and are approximately 0.5 to 1.5 inches in length. The ends of the plugs 172 may be seated in indentations formed in the upper and lower linkage member base plates, 178 and 184, respectively, indentations not shown. In the depicted embodiment of the invention the rod 174 is welded or otherwise secured to the upper linkage member base plate 178 between the elastomeric plugs 172 and has a threaded outer surface 204. The rod 174 extends through an opening 206 formed in the lower linkage member base plate 184 between the elastomeric plugs 172. The catch 176 is in the form of a complementary nut that is secured over the free end of the rod 174 adjacent the outer surface of the lower linkage member base plate 184. One or more washers 208 formed of elastomeric material are disposed over the rod between the outer surface of the lower linkage member base plate 184 and the catch 176.

When a downward force is imposed on handlebar assembly 160, the upper and lower linkage members 162 and 164, respectively, pivot downwardly and are urged together. This movement causes the elastomeric plugs 172 to be compressed between the upper and lower linkage member base plates 178 and 184, respectively. Upon release of the downward force, the elastomeric qualities of the plugs 172 cause them to expand to urge the linkage members 162 and 164 apart to force the assembly 160 upward. The upward motion of the assembly 160 is stopped by the action of the elastomeric washers 208 abutting the outer surface of the lower linkage member base plate 178. The elastomeric qualities of the washers 208 serve to damp the actual sensation of movement of the assembly 160.

This assembly 160, like the other assembly 10, serves to damp and reduce the mechanical shock to which the cyclist would otherwise be exposed. Moreover, the slides 170 serve to allow the cyclist to adjust the position of the handlebars 24 relative to the front fork stem.

Figure 9A:
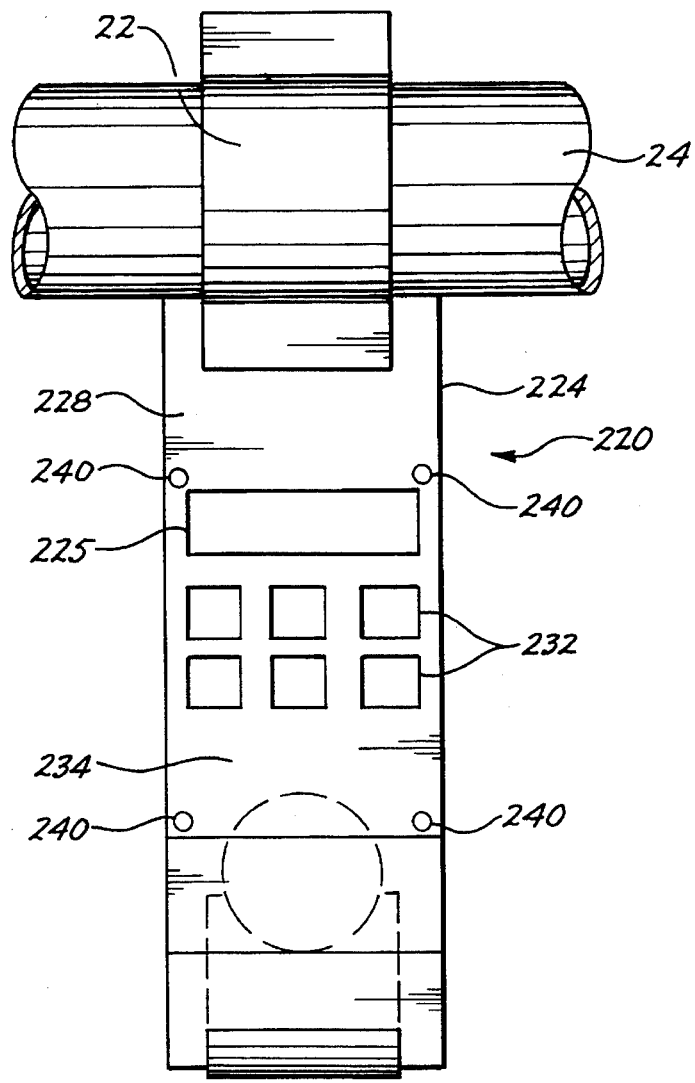
FIG. 9A is a plan view of the handlebar assembly of this invention including a speedometer processing unit.
Figure 9B:
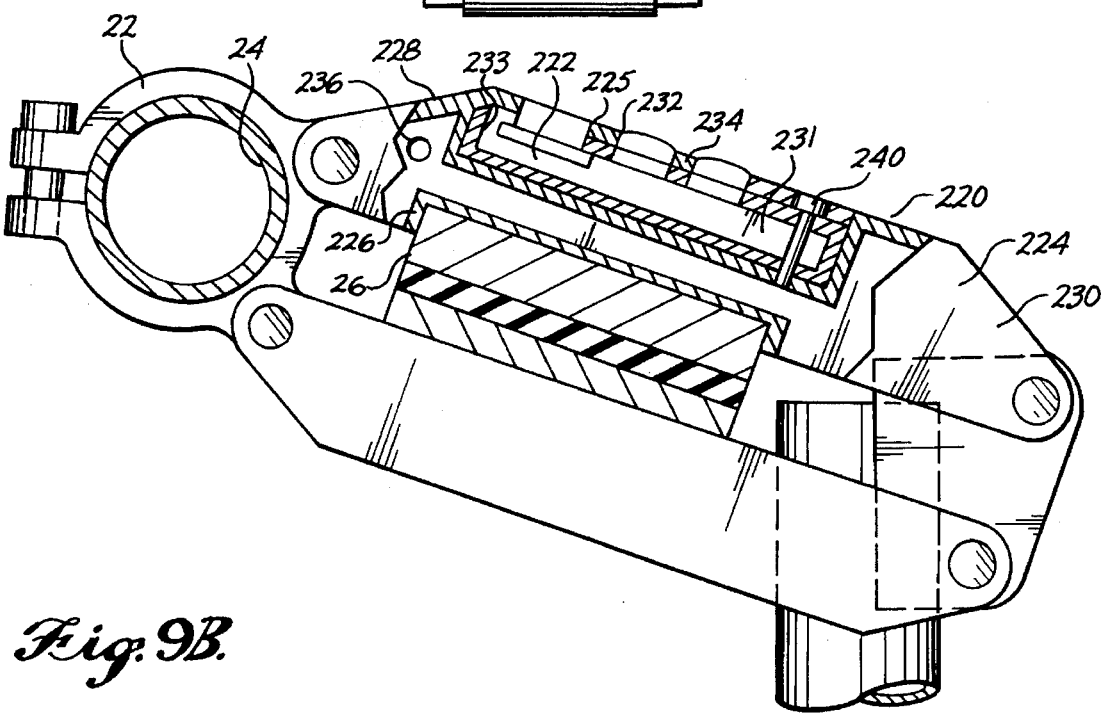
FIG. 9B is a side view, in partial cross section, of the speedometer of FIG. 9A mounted on the handlebar assembly of FIG. 1.

FIGS. 9A and 9B depict another handlebar assembly 220 of this invention that includes a speedometer processing unit 222 integral therewith. According to this embodiment of the invention, an upper linkage member 224 includes a base plate 226 against which an elastomeric block 26 is disposed. The upper linkage member further includes a top plate 228 that is integrally connected to the base plate 226 by a pair of sidewalls 230 that extend therebetween. The top plate 228 is formed with a recess 231 in which the speedometer processing unit 222 is disposed. Foam padding 233 is provided on the surfaces of the top cover that defines the recess 231 to cushion the speedometer unit 222. A cover 234 is provided over the top plate recess 231 for securing the speedometer processing unit 222 therein. The undersurface of the cover 234 is also provided with foam padding 233 to further cushion the speedometer processing unit 222.

The cover 234 is formed with a first elongate rectangular opening 225 through which a display of the speedometer processing unit 222 can be viewed and a set of smaller square openings 232 for actuating the keys of the speedometer processing unit 222. A small opening 236 is formed in one side of the upper linkage member sidewalls 230 so that a cable (not illustrated) can be connected between the speedometer sensor on the front wheel to the processing unit 222. The cover 234 is secured to the upper linkage member top base plate 226 by nonstandard fasteners 240, for example, hex nuts.

An advantage of this embodiment of the invention is that, in addition to providing a means for damping and absorbing mechanical shock to which the cyclist would otherwise be exposed, it provides a means for securing a speedometer processing unit 222 to a bicycle that is streamlined so that it appears built-in, is aesthetically pleasing, and is relatively secure from theft.

Figure 11:
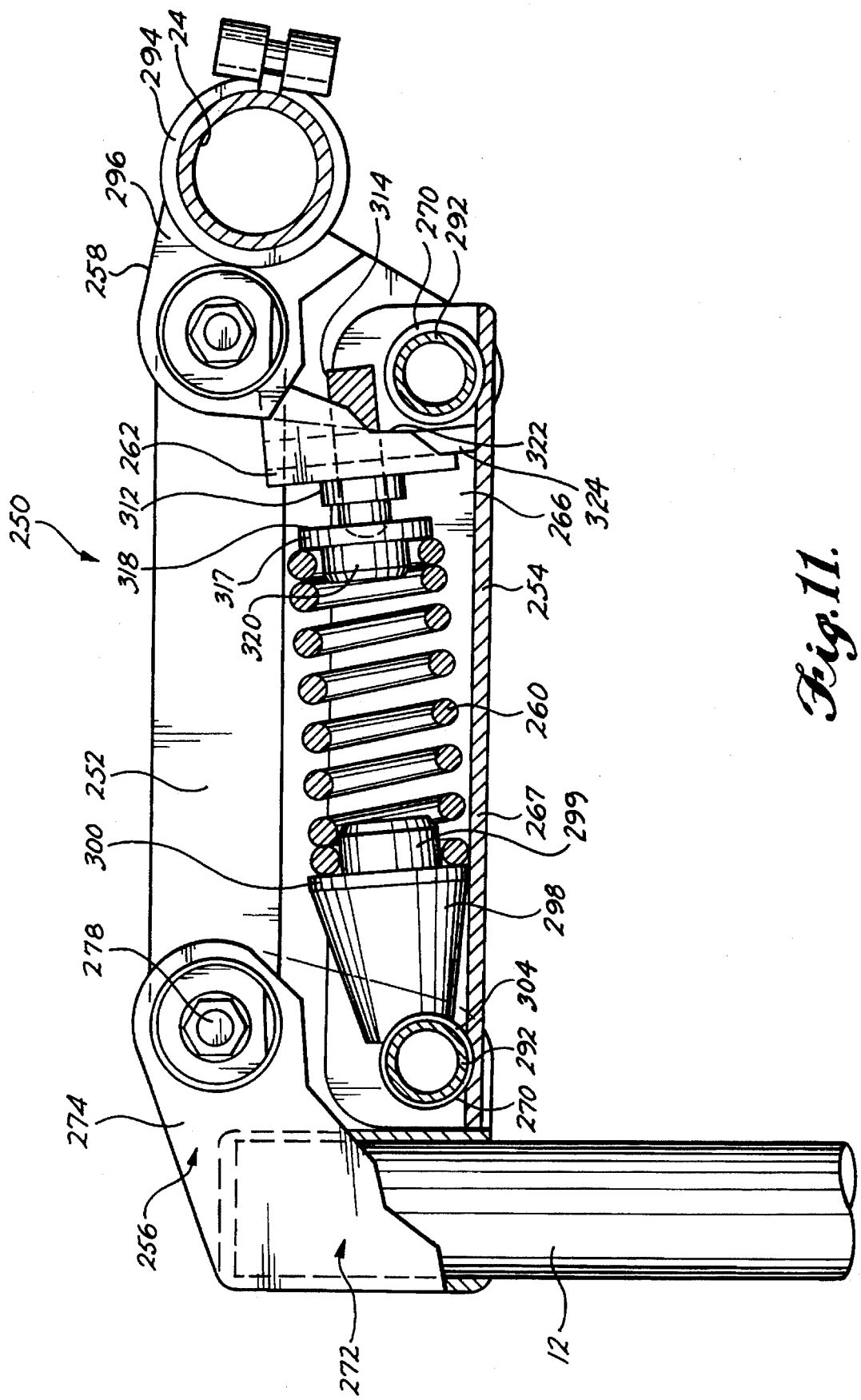
FIG. 11 is a partial cutaway side view of the embodiment of the invention of FIG. 10.

Another handlebar assembly 250 of this invention is depicted by FIG. 10–12. Handlebar assembly 250 includes an upper linkage member 252 and a lower linkage member 254, which are both pivotally connected at one end of a mounting block 256 attached to the head of the front fork stem 12. The opposite ends of the linkage members 252 and 254 are attached to a handlebar clamp 258. A coil spring 260 extends between the tail end of the lower linkage member 254 and a stop assembly 262 mounted to the front end of the upper linkage member 252.

Upper linkage member 252 is in the form of a hollow metal tube that is shaped to have a generally oval cross-sectional profile. A tubular sleeve 264 is attached to each end of the upper linkage member 252 to extend laterally across the linkage member. Lower linkage member 254 is formed from a channel-shaped piece of metal having two parallel sidewalls 266 that extend perpendicularly outward away from a base section 267. The lower linkage member 254 is oriented so that the exposed edges of the sidewalls 266 are adjacent the upper linkage member 252. The opposed sides of the lower linkage member define a spring space 268 in which the spring 260 and stop assembly 262 are disposed. A pair of tubular sleeves 270 extend between the sidewalls adjacent the front and rear edges of linkage base section 267. Sleeves 264 and 270 define passageways (not identified) that extend laterally through the ends of the linkage members 252 and 254, respectively, to facilitate the insertion of hardware for attaching the members to the other components of the assembly 250.

Mounting block 256 is formed with a cylindrical bore 272 to facilitate securing the mounting block to the head of the front fork stem 12. Fastening elements, not shown, may be used to secure the mounting block 256 in place. A pair of flanges 274 extend forward from the rear half of the mounting block 256. The flanges 274 extend tangentially away from symmetrically opposed points located on either side of the longitudinal centerline of the mounting block 256. The flanges 274 are each bent so that the outermost sections thereof form a pair of parallel, spaced-apart tabs 276.

Linkage member 252 is pivotally secured to the mounting block tabs 276 by a fastening assembly 278, as depicted in FIG. 13A. Fastening assembly 278 includes a pair of ranged bushings 279 formed of Teflon (polytetrafluoroethylene plastic), bronze, or other suitable low-friction material that extend through openings formed in the tabs 276 and partially into the passageway defined by the adjacent upper linkage member sleeve 264. Washers 284, formed of TEFLON™ (polytetrafluoroethylene, a waxy, opaque material) or other low-friction, noncorrosive material, are disposed around each bushing 279 between the adjacent surfaces of the tabs 276 and the sleeves 264. The bushings 279 are held in place by a bolt 286-and-nut 287 assembly, wherein the bolt extends through openings (not identified) formed in the bushings, and the nut is seated in one of the bushings. A spacer 277 is disposed around the bolt 286 between the bushings 279 to prevent bolt 286 from being compressed to the point where the bushings 279 are compressed.

Bushings 279 are formed with a cut 280 and the bushings are seated in complementary D-shaped counterbores 275 to prevent the bushings from rotating. It is anticipated that the inside walls of bushings 279 will be formed to conform with the outside walls of nuts 287 to prevent the nuts from rotating. In some preferred embodiments of the invention, nuts 287 will have rounded heads adapted to receive an Allen wrench. Bolts 286 are of a length so that their heads will be located inside the associated bushings 279 when the fastening assemblies 278 are put together.

Figure 13B:
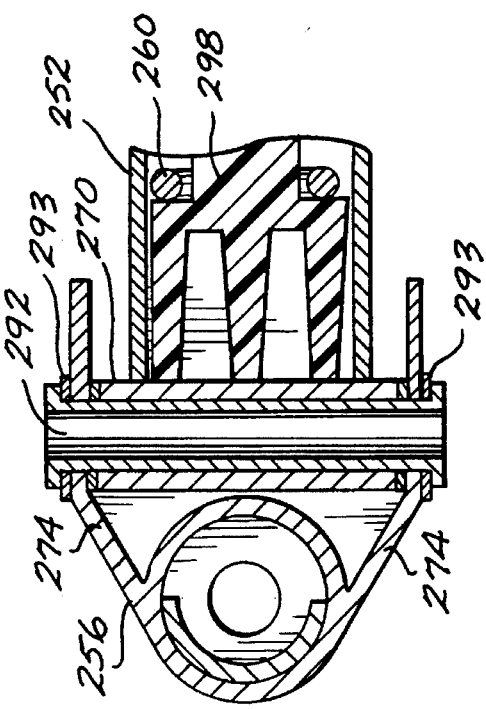

Lower linkage member 254 is pivotally secured to the mounting block tabs 276 by a pivot pin 292, as depicted in FIG. 13B. Pivot pin 292 is a tube-shaped pin that extends through concentric openings formed in the tabs 276 and through the passageway defined by the adjacent lower linkage member sleeve 270. Washers 293 are disposed over the exposed ends of the pivot pins 292. In some preferred embodiments of the invention, the ends of the pivot pin 292 used to secure the lower linkage member 254 to mounting block 256 are bent over onto the mounting block tabs 276 to permanently secure the pin in place. The pivot pin 292 used to secure lower linkage member 254 to handlebar clamp 258 is releasably secured in place by a flat, C-shaped retaining ring 291, as described hereinafter.

Handlebar clamp 258, as seen in FIGS. 10 and 11, has a main body 294 in the shape of elongated split O-ring similar to the main body 40 of the first described handlebar clamp 22 (FIG. 2). A pair of parallel, spaced-apart tabs 296 formed integrally with the main body 294 extend toward the mounting block 256. Upper linkage member 252 is pivotally attached to the handlebar clamp 258 by a fastening assembly 278. The bushings 279 and bolt 286 of the assembly extend through openings (not identified) in the tabs 296 and into the passageway of the upper linkage member sleeve 264. Lower linkage member 254 is secured to the handlebar clamp 258 by a pivot pin 292. Pivot pin 292 extends through concentric openings formed in the tabs 296 and through the passageway in the linkage member sleeve 270. Pivot pin 292 is releasably secured to the handlebar clamp 258 by retaining ring 291, which is disposed against the adjacent tab 296. Pivot pin 292 may be formed with a groove 289 to facilitate the interconnection of retaining ring 291.

One end of the spring 260 is held in place by a pivoting spring seat 298 that is disposed against the lower linkage member sleeve 270 adjacent the mounting block 256. Spring seat 298 is formed from a single piece of nylon or other low-friction material. The spring seat has a base 300 from which three parallel ribs 302 extend. Ribs 302 are formed with exposed faces 304 distal from the base 300, which has a concave profile. The profile of the rib faces 302 conforms to the outer curvature of the adjacent sleeve 270 so that the spring seat 298 can be fitted against the sleeve. A round protrusion 299 extends above the spring seat base 300. The diameters of the spring seat base 300 and protrusion 299 are selected so that the spring 260 can be fitted over the protrusion and rest against the base.

The opposed end of the spring 260 is disposed against the stop assembly 262. The stop assembly consists of a three-sided bracket 308 that extends down from the upper linkage member 252 adjacent the handlebar clamp 258. Bracket 308 is positioned so that the sides thereof are parallel to the longitudinal axis of the upper linkage member 252 and the center section thereof extends across the linkage member. It will be understood that, while bracket 308 is shown in fixed relation to upper linkage members 252, bracket 308 may also be formed to be adjustable longitudinally. The movement of bracket 308 toward the from fork stem 12 will allow the handlebars to be raised upwardly in their static position. The center section of bracket 308 is provided with an opening over which a threaded ring 312 is secured. A set screw 314 is disposed in the opening and is adjustably held in place by the threaded ring 312. Set screw 314 has a rounded tip against which a metal spring seat 316 is disposed. Spring seat 316 has a circular base 317 formed with a concave indentation 318 (shown in phantom) so that the seat can be disposed over the tip of the set screw 314. A cylindrical boss 320 extends above the opposed side of the spring seat base 317. Spring seat base 317 and boss 320 are dimensioned so that spring 260 extends over the boss and rests against the base. Both spring seats 298 and 316 are held in place by the outward expansion of the opposed ends of spring 260.

The sides of bracket 308 slope downward toward the adjacent end of the upper linkage member 252. The sides of the bracket 308 are further formed with concave indentations 322 to keep the bracket spaced from the adjacent lower linkage member sleeve 270. A pad 324 formed of rubber or other compressible elastomeric material is fitted over set screw 314 between the sides of the bracket 308. The opening in the pad 324 through which the set screw 314 passes is dimensioned to have a relatively tight fit around the screw. The pad 324 normally abuts the adjacent lower linkage member sleeve 270.

The handlebar assembly 250 of this embodiment of the invention is arranged so that a spring 260 normally exerts a biasing, or preload, force against both the spring seat 298 disposed against the lower linkage member sleeve 270, and against the spring seat 316 that is disposed against the stop assembly 262. Set screw 314 allows the overall static bias, the static-state spring expansion, to be adjusted for the preference of the cyclist. When a cyclist is exposed to a jolt or bump and pushes downward on the handlebars 24, linkage members 252 and 254 pivot downward. A fraction of the energy imparted to the handlebars by the cyclist is absorbed by the downward movement of the assembly 250. During this downward movement, the stop assembly 262 moves toward the opposed spring seat 298, which, along with spring 260 is pivoting downward with the rest of the assembly, to further compress the spring 260. Upon release of the downward force by the cyclist, the spring 260 is able to expand to urge the assembly 250 upward. The upward movement of the assembly 250 is stopped by the abutment of the stop pad 324 against the lower linkage member sleeve 270.

Spring 260 of this assembly 250 of the invention extends horizontally along a significant portion of the length of the lower linkage member 254. Consequently, the spring has a relatively long length over which it can be compressed, as opposed to springs that are merely disposed between the upper and lower linkage members. As a result, the spring can be significantly more flexible than those that would otherwise extend generally vertically between the linkage members. This enhances the assembly 250's ability to attenuate the road shock, which would otherwise be transferred to the cyclist. Moreover, spring 260 extends between two easily accessible points in the assembly 250, between the lower pivot point of the mounting block 256 and the stop assembly 262. As a result, the spring can readily be inserted in place during the manufacture or maintenance of the assembly 250.

Stop assembly pad 324 provides a cushioned stop to the upward movement of the assembly 250. Moreover, the static angle of the assembly can be readily modified by simply changing the thickness of the pad 324 used with the assembly; relatively thick pads can be coupled to the assembly when it is desired to have a relatively small angle between the assembly and the horizontal, and relatively thin pads can be used when it is desired to increase that angle. Furthermore, the stop pad serves to lock the set screw 314 in place. This prevents the high-frequency vibrations that are invariably imparted to the assembly 250 from working the set screw 314 free from the position to which it has been preset.

Still another advantage of this assembly is that the spring is positioned to minimize sliding friction. This enhances the overall flexibility of the assembly to further reduce the mechanical shock to which the cyclist would otherwise be exposed. Also, the interface between the stop assembly 262 and the adjacent lower linkage member sleeve 270 is located between the sidewalls 266 of the lower linkage member. The lower linkage member 254 thus serves to cover up a pinch point in which either an article of the cyclist's clothing or part of the cyclist's body could otherwise become caught.

Figure 14:
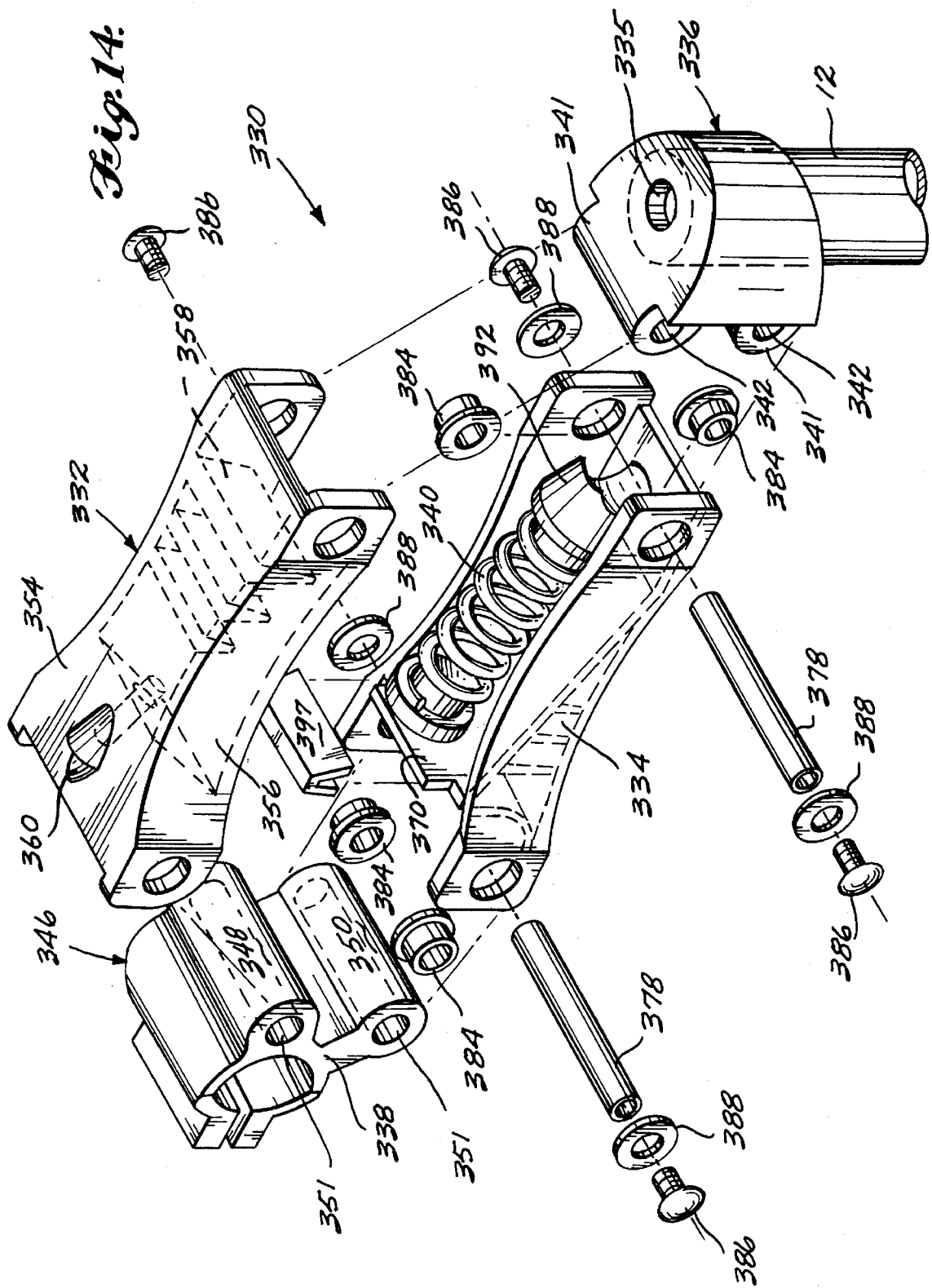
FIG. 14 is an exploded perspective view of an alternative embodiment of this invention.

FIGS. 14–16 illustrate an alternative assembly 330 of this invention specially adapted for use with a touring bicycle. Assembly 330 includes an upper linkage member 332 and a lower linkage member 334, both of which have generally rectangular cross-sectional profiles. Linkage members 332 and 334 are attached to a mounting block 336 fitted over the head of the front fork stem 12. The ends of the linkage members 332 and 334 distal from the mounting block 336 are attached to handlebar clamp 338 to which the handlebars 24 are attached. A spring 340 extends diagonally between the linkage members 332 and 334.

Mounting block 336 is in the form of a cap provided with an opening 335 for receiving a conventional expander bolt (not illustrated) for securing the block to the front fork stem 12. Alternatively, adhesives may be used either with or without conventional fastening elements to secure the mounting block 336 to the threaded front fork stem. A pair of rounded ribs 341 extend laterally across the front of the mounting block 336 and are formed with bores 342 designed to receive hardware for attaching the linkage members 332 and 334 thereto. Handlebar clamp 338 is in the form of a one-piece structure that has a main body 346 similar to that in the previously described handlebar clamp 22 (FIG. 2). A first, upper pillar 348 and a second, lower pillar 350 are both formed integrally with a clamp main body 346. Both pillars 348 and 350 are formed with bores 351 designed to accept hardware for pivotally mounting the linkage members 332 and 334 thereto. In the illustrated embodiment of the invention, the lower pillar 350 is shaped so that the bore 351 associated therewith is located farther away from the center of the clamp main body 346 than the bore 351 of upper pillar 348. In other embodiments of the invention, handlebar clamp 338 may be formed so that pillars 348 and 350 have different positions relative to the axis of the main body 346 to allow for different positioning of the handlebars 24.

Upper linkage member 332 is formed of a single piece of metal that is shaped to have a top plate 354 and a pair of side plates 356 extending downward from the top plate 354. In one preferred embodiment of the invention, upper linkage member 332 has a tapered profile such that it is narrow in the center and relatively wide on the ends that are attached to mounting block 336 and handlebar clamp 338. A set of three stiffening ribs 358 extend laterally across the inside of upper linkage member 332 between the side plates 356 adjacent mounting block 336. Stiffening rib 358 located closest to mounting block 332 is the longest of the three ribs. Stiffening rib 358 located farthest from the mounting block is the shortest of the three ribs, and the rib located therebetween is of intermediate length. The decreasing length of the ribs 358 ensures that the spring 340, when compressed, will not contact or otherwise abut the ribs. Upper linkage member 332 is further formed to include a threaded bore 360 located adjacent the point at which the member is attached to the handlebar clamp 338. Threaded bore 360 is oriented downward such that it is directed toward the point where the lower linkage member 334 is pivotally attached to the mounting block 336. Upper linkage member 332 further includes a tab 359 that extends downward from the portion of the member that defines the rearward section of the bore 360. The upper linkage member 332 is positioned so that at one end the member side plates 356 are fitted over the upper mounting block rib 341 and at the opposed end are fitted over the upper handlebar clamp pillar 348.

Lower linkage member 334 is formed of a single piece of metal and includes a base plate 361 to which two side plates 362 are attached along the longitudinal edges thereof. Base plate 361 includes a first section 364 located adjacent the mounting block 336, which extends across the lower edges of the side plates 362 and a second section 366 that extends diagonally upward from the first section in the general direction of the handlebar clamp upper pillar 348. The base plate second section 366 terminates at the top edge of the side plates 362 and meets with a front plate 368. Front plate 368 is a generally L-shaped member that includes a tab 370 that extends above the linkage member side plates. The portion of the front plate 368 that extends below the tab 370 curves forward such that the lower portion of the plate extends across the opposed lower edges of the side plates. Lower linkage member 334 is further formed with three stiffening ribs 372 that extend across the side plates 362 between the base plate second section 366 and the lower edges of the side plates. The lower linkage member is positioned so that, at one end, the side plates 362 are fitted over the lower of the mounting block ribs 341 and at the other end are fitted over the lower handlebar clamp pillar 350.

Linkage members 332 and 334 are pivotally connected to the mounting block 336 and the handlebar clamp 338 by fastening assemblies 376, one shown in detail in FIG. 16. Each fastening assembly 376 includes a tubular sleeve 378 that is fitted into either a bore 342 or 351, of either the mounting block 336 or the handlebar clamp 338. The sleeve 378 also extends through a pair of concentric openings 380, one opening shown, formed in the linkage member side plate 356 or 362 with which the sleeve is associated. FIG. 17 depicts how upper linkage member 332 is connected to handlebar clamp upper pillar 348. Bushings 382, formed of Teflon, bronze, or other low-friction material, are disposed over the opposed ends of the sleeve 378 between the sleeve and the adjacent sections of the linkage member side plates 356 or 362 that define the openings 380. Each bushing 382 is formed with an annular flange 384. The bushings 382 are arranged so that the flanges 384 are disposed between the mounting-block ribs 341 or the handlebar clamp pillars 348 or 350, and the adjacent linkage member side plates 356 or 362. A button-head screw 386 is fitted over the exposed ends of each sleeve 378. A washer 388 formed of Teflon, Nylon, or other low-friction material, is fired over the head of each screw 386 such that the washer is located between the screw and the adjacent linkage member side plate 356 or 362.

A spring seat 392, substantially identical to the previously described low-friction spring seat 298 (FIG. 10), is used to mate one end of spring 340 with the sleeve 378 used to interconnect lower linkage member 334 to mounting block 336. The opposite end of spring 340 is fitted over a metallic spring seat 394 substantially identical to the spring seat 316 of the previously described embodiment of the invention. Spring seat 394 is held in place by a set screw 395 secured in threaded bore 360. A cap 397, having the shape of an elongated U and formed of compressible elastomeric material, is fitted over the tab 370 that extends upward from lower linkage member 334.

When the assembly 330 of this embodiment of the invention is installed on a bicycle, the preload compression of the spring 340 maintains the assembly and handlebars 24 in their normal, upright, static position. Both spring seats 392 and 394 are also held in place by the normal, static, expansion of the spring 340. When the cyclist exerts a downward force on the handlebars 24, the linkage members 332 and 334 pivot the assembly and handlebars downward. Downward movement of the assembly 330 urges the adjacent metallic spring seat toward the static spring seat to further compress the spring 340. Upon release of the downward force by the cyclist, the spring 340 returns the assembly to the initial position. The upward movement of the assembly is stopped by the action of the upper linkage member tab 359 abutting the cap attached over the lower linkage member tab 370.

The stiffening ribs of this embodiment of the invention provide lateral strengthening of the linkage members 332 and 334. Consequently, this assembly is well suited to withstand lateral stress that a cyclist may impose on the assembly due to uneven stresses that a cyclist imposes on the handlebars 24 during riding. The stop or static angle of assembly 330 of this embodiment of the invention can be adjusted by fitting caps 397 having different overall widths over tab 370. Caps 397 having relatively wide walls can be installed in the assembly 330 so that the linkage members 332 and 334 are positioned relatively horizontally; caps with relatively thinner walls can be fitted over the tab when it is desirable to set the assembly so that the linkage members and the handlebars 24 are located in a more upwardly oriented position. Moreover, lower linkage member tab 370 extends into the space between the upper linkage member side plates 356 before striking the complementary upper linkage member tab 359. Thus, the stop mechanism of this embodiment does not create an exposed pinch point.

Still another feature of this embodiment of the invention is that the linkage members 332 and 334 can be molded of aluminum or other lightweight material. This serves to reduce the overall weight of the assembly 330. Moreover, the linkage members can be formed into aesthetically pleasing shapes by the molding process.

Figure 18:
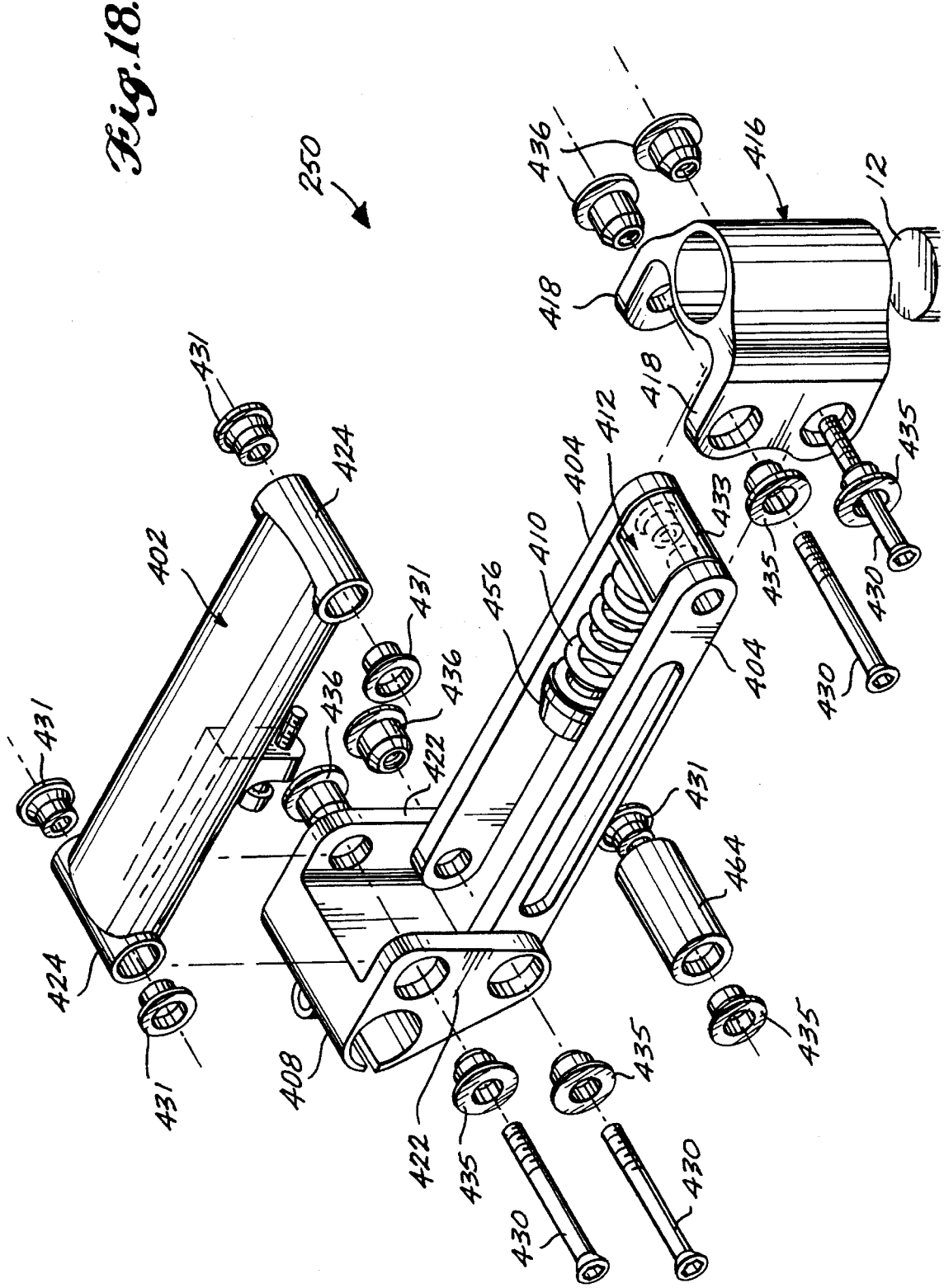
FIG. 18 is an exploded perspective view of an alternative embodiment of this invention.
Figure 19:
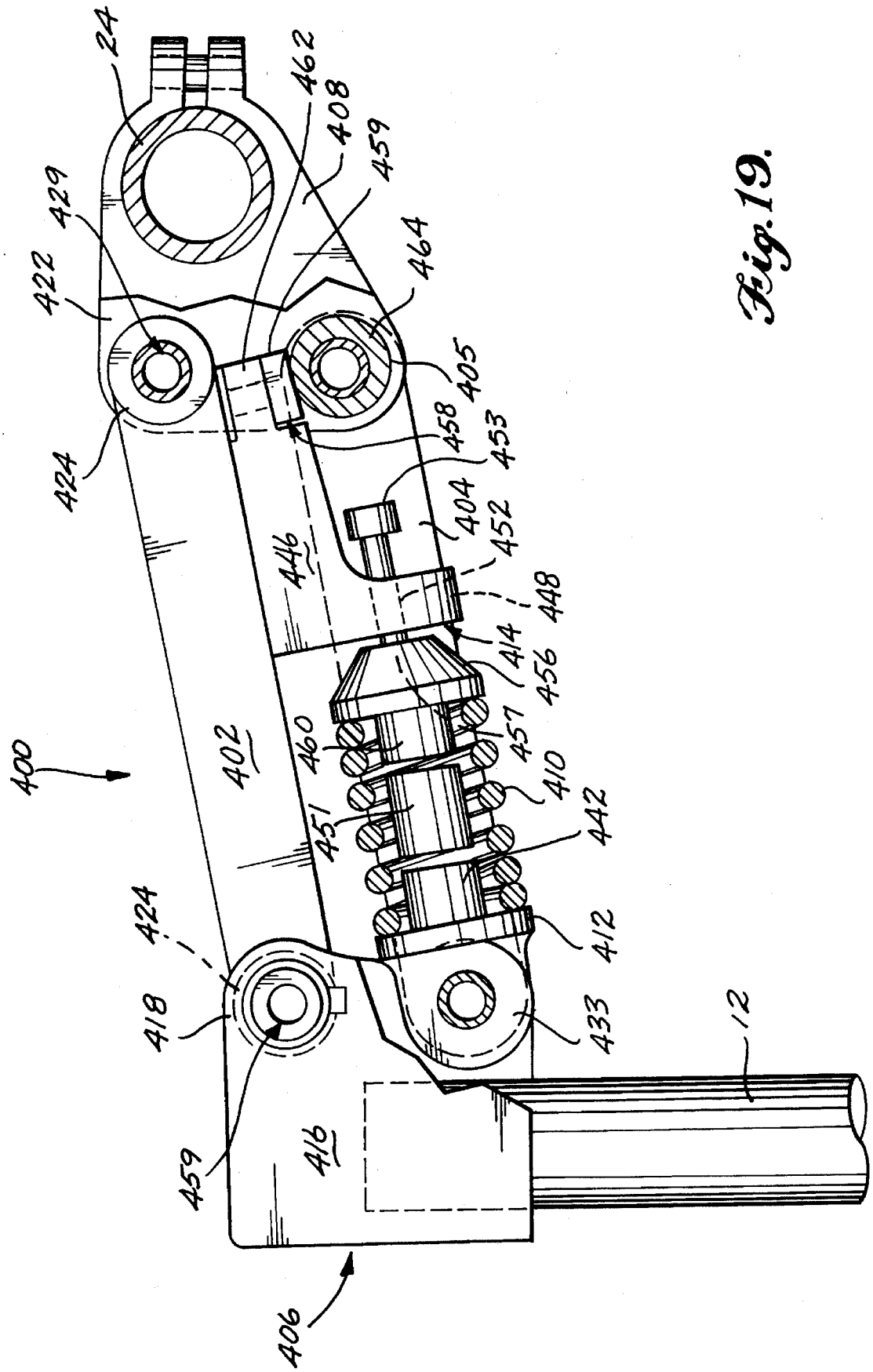
FIG. 19 is a partial cutaway side view of the embodiment of the invention of FIG. 18.
Figure 20:
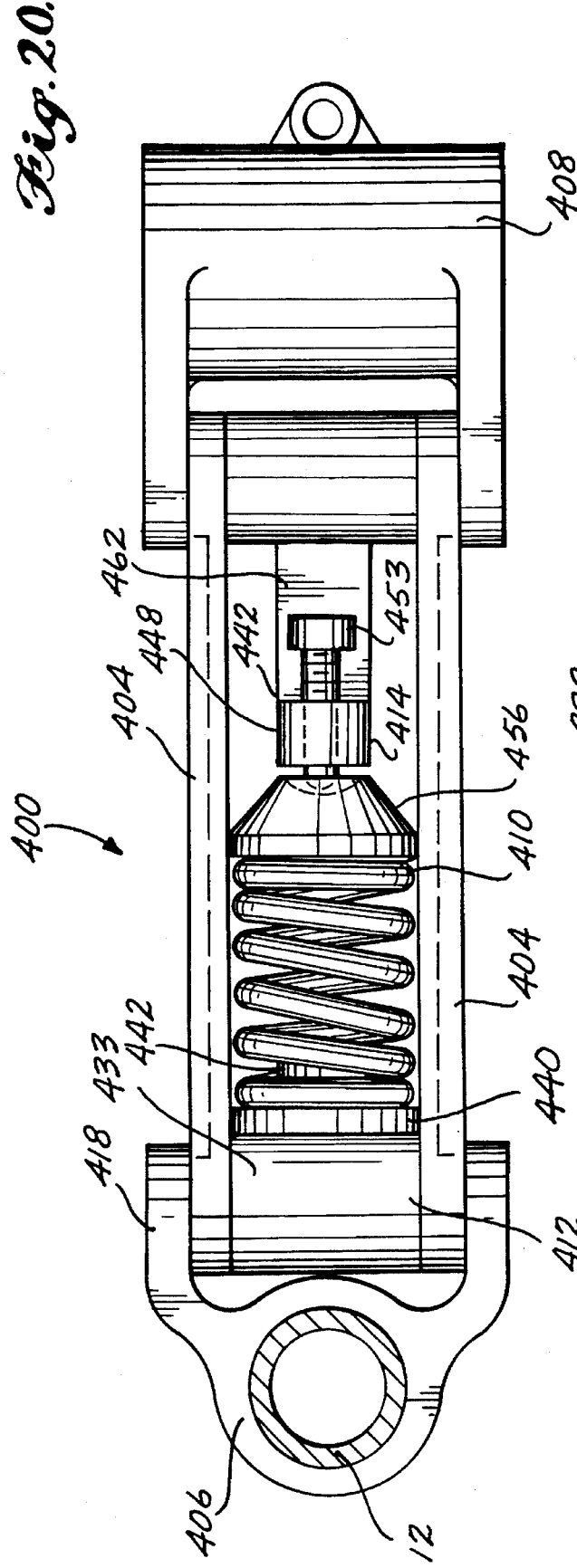
FIG. 20 is a partial cutaway bottom view of the embodiment of the invention of FIG. 18.

FIGS. 18–20 illustrate another embodiment of a handlebar assembly 400 of this invention. Assembly 400 includes an upper linkage member 402, a pair of spaced-apart, parallel lower linkage members 404, a mounting block 406, and a handlebar clamp 408. A spring 410 is disposed between the lower linkage members 404. Spring 410 extends between a down-stop 412 pivotally mounted to the mounting block 406 and an up-stop assembly 414 formed integrally with the upper linkage member 402, which extends between the lower linkage members 404.

Mounting block 406 consists of a tubular female adapter 416 dimensioned to be secured over the head of the bicycle front stem 12. A pair of parallel, spaced-apart mounting flanges 418 extend outward from the female adapter 416. Handlebar clamp 408 includes a main body 420 substantially identical to the main body 40 of the first described handlebar clamp 22 (FIG. 2). A pair of parallel, spaced-apart flanges 422 extend rearward from the opposed ends of the handlebar clamp main body 420. Both the mounting block flanges 418 and the handlebar clamp flanges 422 are formed with openings (not identified) to facilitate the coupling of hardware for mounting the linkage members 402 and 404 thereto.

Upper linkage member 402 is a cylindrical aluminum tube that, in the illustrated embodiment of the invention, has an oval cross-sectional profile. Cylindrical mounting sleeves 424 are attached to each end of upper linkage member 402 such that the sleeves extend transversely, or laterally, across the opposed ends of the member. The lower linkage members 404 consist of solid aluminum bars that extend between mounting block 406 and the handlebar clamp 408. In the depicted embodiment of the invention, the lower linkage members 404 are each formed with a groove 428 along the outer surface thereof. The grooves 428 serve to reduce the overall weight of the lower linkage members 404 and of the assembly 400. The ends of the lower linkage members 404 are formed with openings 405 to facilitate the insertion of mounting hardware. Assembly 400 is arranged so that both the upper linkage member 402 and the lower linkage members 404 are mounted between the mounting block flanges 418 and the handlebar clamp flanges 422.

FIG. 18A depicts in detail one of the fastening assemblies 429 used to secure the linkage members 402 and 404 to the mounting block 406 and the handlebar clamp 408. FIG. 18A specifically depicts how a fastening assembly 429 is used to secure the upper linkage member 402 to the mounting block 406. Fastening assembly 429 includes a bolt 430 that extends through the openings formed in the mounting block flanges 418 and the upper linkage member sleeve 424. An internal bushing 431 is welded, soldered, or otherwise permanently secured to each end of the upper linkage member sleeve 424. Each bushing 431 has a flange 431a that is disposed around the outside of the sleeve 424, a female tapered section 431b that extends into the sleeve, and a tubular section 431c that is located inside of the sleeve. The sleeve 424 is formed with a counterbore (not identified) to facilitate the mating of the bushings 431 thereto. In some preferred embodiments of the invention bushings 431 are formed of steel.

First and second external bushings, 435 and 436, respectively, are fitted over the opposed mounting block flange 418 openings and extend into the sleeve 424. First external bushing 435 has a flange 435a that is disposed against the mounting block flange 418, a first inwardly tapered section 435b that extends into the flange opening, a tubular section 435c that extends to the inside surface of the flange, and a second inwardly tapered section 435d that extends into the sleeve 424. Second external bushing 436 has a flange 436a that is disposed against the mounting block flange 418, an intermediate tubular section 436b that extends through the flange, and an inwardly tapered section 436c that extends into the sleeve 424. The inside of the second external bushing is further provided with threading (not identified) to facilitate securing the bolt 430 thereto. External bushings 435 and 436 are formed of bronze, brass, or other material that has a low coefficient of friction. External bushings 435 and 436 are formed so that outer surfaces of the first external bushing second tapered section 435d and of the second external bushing tapered section 436c are identical in dimension to the inner surfaces of the adjacent internal bushing tapered sections 431b.

When this embodiment of the invention is assembled, the bolt 430 is passed through the bushings 431, 435, and 436 and is secured by the complementary threading of the second external bushing 436. The head of the bolt 430 is disposed in the space defined by the first external bushing first tapered section 435b. As the bolt 430 is tightened, mounting block flanges 418 are urged toward the upper linkage member sleeve 424 so that the first bushing second tapered section 435d and the second external bushing tapered section 436c are urged into contact with the adjacent internal bushing tapered sections 431c. The fastening assembly 429 thus functions as an adjustable damping mechanism that uses the friction that is developed along the internal bushing/external bushing interface to slow the pivoting movement of the linkage member 402.

The spring down-stop 412, as depicted in FIG. 19, is a single-piece unit formed of nylon or other low-friction material that extends around the pivot pin 430, and is used to mate the lower linkage members 404 to the mounting block 406. The down-stop 412 has a generally tube-shaped body 433, which is disposed about the fastening assembly 429 and serves to keep the linkage members 404 spaced apart. A protrusion 440 defines a generally circular surface and extends outward from one section of the body 433. A small cylindrical boss 442 extends outward from the center of the protrusion 440. The diameters of the protrusion 440 and the boss 442 are selected so that the spring 410 can be fitted over the boss and rest against the outer surface of the protrusion.

The spring up-stop assembly 414 consists of a mounting bracket 446 welded or otherwise permanently secured to the undersurface of the upper linkage member 402 adjacent handlebar clamp 408. Bracket 446 includes a solid finger 448, which extends perpendicularly downward from the upper linkage member 402. Finger 448 is formed with a threaded bore 452 adapted to receive a set screw 454. Spring 410 abuts a metallic spring stop 456 that is held in place by the set screw 454 adjacent the finger 448. Spring stop 456 is formed of a single piece of metal and has a shape that approximates a slice through a cone. The tip or narrow end of the spring stop 456 is formed with a recess 457 such that the end can be fitted over the tip of the set screw 454. A cylindrical boss 460 extends outward from the center of the opposite surface of the spring stop 456. Spring stop 456 and boss 460 are dimensioned so that spring 410 extends around the boss and rests against the adjacent surface of the stop.

An elastomeric plug 451 is disposed inside the coil spring 410 between the down-stop 412 and the spring stop 456. The plug 451, which floats in position, serves as a cushioning member to prevent the overcompression of the spring 410 in the event the linkage members 402 and 404 are forced excessively downward.

Bracket 446 further includes an extended section 462 that extends generally perpendicularly from the finger 448 toward the handlebar clamp 408. The bracket 446 is shaped so that extended section 462 defines an outer surface that has a slope that tapers toward the end of the upper linkage member 402. In other words, the extension section 462 is relatively wide adjacent the finger 448, but narrower adjacent the end of the upper linkage member 402. The end of the extended section 462 adjacent the end of the linkage member 402 is formed with a cutout 458 in which a plastic button 459 is secured. The button 459 has a slope identical to that of the bracket's extended section 462. A sleeve 464 is fitted over the fastening assembly 429 that couples the lower linkage members 404 to the handlebar clamp 408. The sleeve 464 abuts the surface of the bracket's extended section 462 to stop the upward movement of the assembly 400. The sleeve 464 also serves to keep the lower linkage members 404 spaced apart.

When a downward force is exerted on the handlebar assembly 400 of this embodiment of the invention, linkage members 402 and 404 are pivoted downward. The up-stop assembly 414 is pivoted toward the down-stop assembly 412 to compress the spring 410 therebetween. Upon release of the downward force, spring 410 is able to expand to move the linkage members 402 and 404 and handlebar 24 upward. Upward movement of the assembly 400 is stopped by the action of the pivot pin 426 abutting the sloping surface of the mounting bracket's extended section 462. An advantage of this assembly is that the flexibility of the linkage members 402 and 404 can be set by adjusting the fastening assemblies 429. The static angle of assembly 400 could be readily changed by simply fitting sleeves 464 of different outer diameters over the pivot pin 426. A large-diameter sleeve 464 can be installed when the cyclist desires only minimal up-angle for the assembly 400 and handlebars; when a larger up-angle is desired, a sleeve having a smaller outside diameter can be installed. The relative soft surface of the button 429 serves to damp the actual stopping movement of the assembly 400 when the sleeve 464 strikes the bracket's extended section 462.

Figure 21:
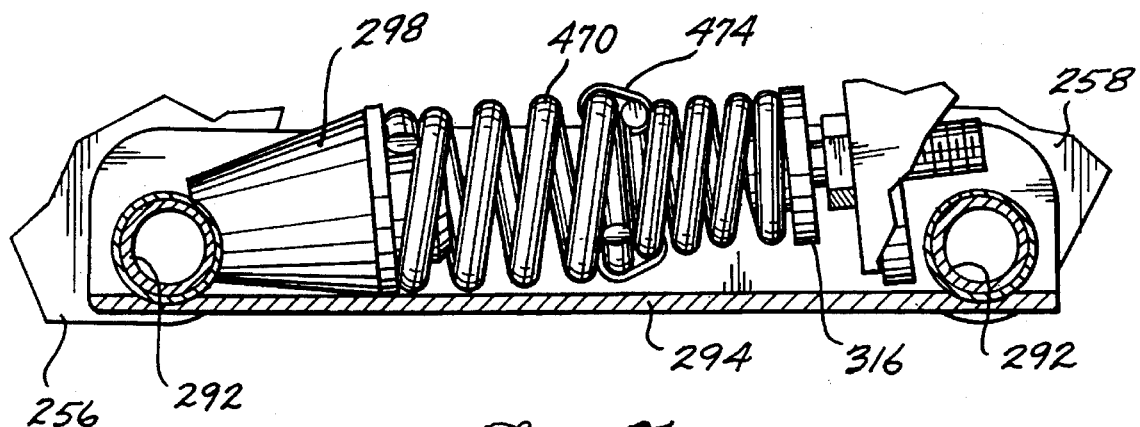
FIG. 21 is a side view of an alternative biasing assembly that can be incorporated into the various embodiments of this invention.

In still other versions of the handlebar assembly of this invention, it may be desirable to provide the assembly with two or more damping members, each designed to withstand a particular form of mechanical shock. For example, FIG. 21 depicts an alternative version of the assembly 250, wherein, instead of a single spring 260 (FIG. 10), two series-connected coil springs 470 and 472 extend between the opposed spring seats 298 and 316. Springs 470 and 472 are held together by a set of clamps 474 and are wrapped around the portions of the springs that interface. In this embodiment of the invention, spring 470, the spring adjacent the mounting block 256, is a relatively stiff spring. Spring 472, the spring adjacent handlebar clamp 258, is significantly more flexible. An advantage of this embodiment of the invention is that spring 472, the more flexible spring, has more give to be able to absorb the continuous white noise, road noise, the small vibrations, that the cyclist is continually exposed to. Spring 470 will flex, or give, to absorb the lower frequency, higher amplitude vibrations that the cyclist is exposed to when passing over bumps or other significant road flaws. It should be understood that the depicted clamps 474 are merely one means for mating the two springs 470 and 472 together; other coupling assemblies may, of course, be employed to accomplish the same task. For example, it may be desirable to mate the springs 470 and 472 to a double-headed spring seat, not illustrated.

Figure 22:
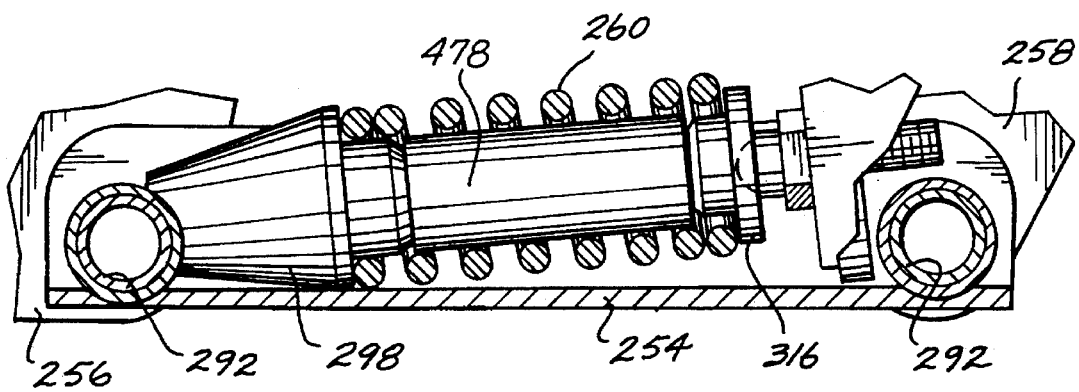
FIG. 22 is a side view of an alternative biasing assembly that can be incorporated into the various embodiments of this invention.
Figure 23:
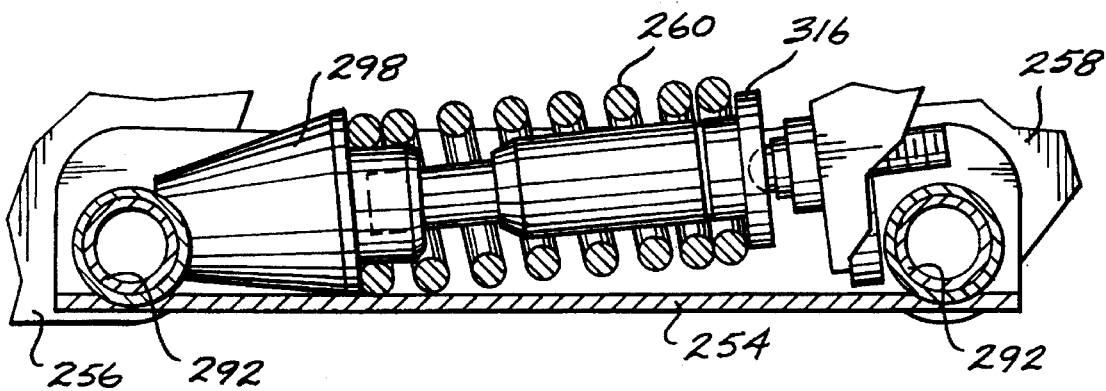
FIG. 23 is a side view of an alternative biasing assembly that can be incorporated into the various embodiments of this invention.

The same advantage can be obtained by fitting an elastomeric plug 478 in the spring 260 between the spring seats 298 and 316 as depicted in FIG. 22. In this embodiment of the invention, it is anticipated that the spring will be selected so that it is suited for absorbing high-frequency vibrations while the elastomeric plug will serve to damp those of low frequency. It is understood that, in alternative versions of this embodiment of the invention, the particular vibrations that each damping member is intended to absorb can be reversed. Still other versions of the invention may employ two spaced-apart elastomeric plugs that come together when the handlebar assembly of this invention is urged downward. Moreover, in still other embodiments of the invention, it may be desirable to use the spring 250 in combination with another damping member, such as a piston 482 or other fluid-based damping device, as depicted in FIG. 23. Again, it is anticipated that, in most constructions of this invention, the spring will serve to damp the higher frequency vibrations while the piston 482 will damp those of low frequency. When either the elastomeric plug 478 or piston 482 is installed in the assembly of this invention, it is anticipated that they will be compression-fitted into place. Alternatively, the elastomeric plug 478 may be secured in place by adhesive, and the piston 482 may be secured in place by threaded fasteners and the like. Moreover, these components may be disposed in locations other than along the center axis of the spring 260.

Figure 24:
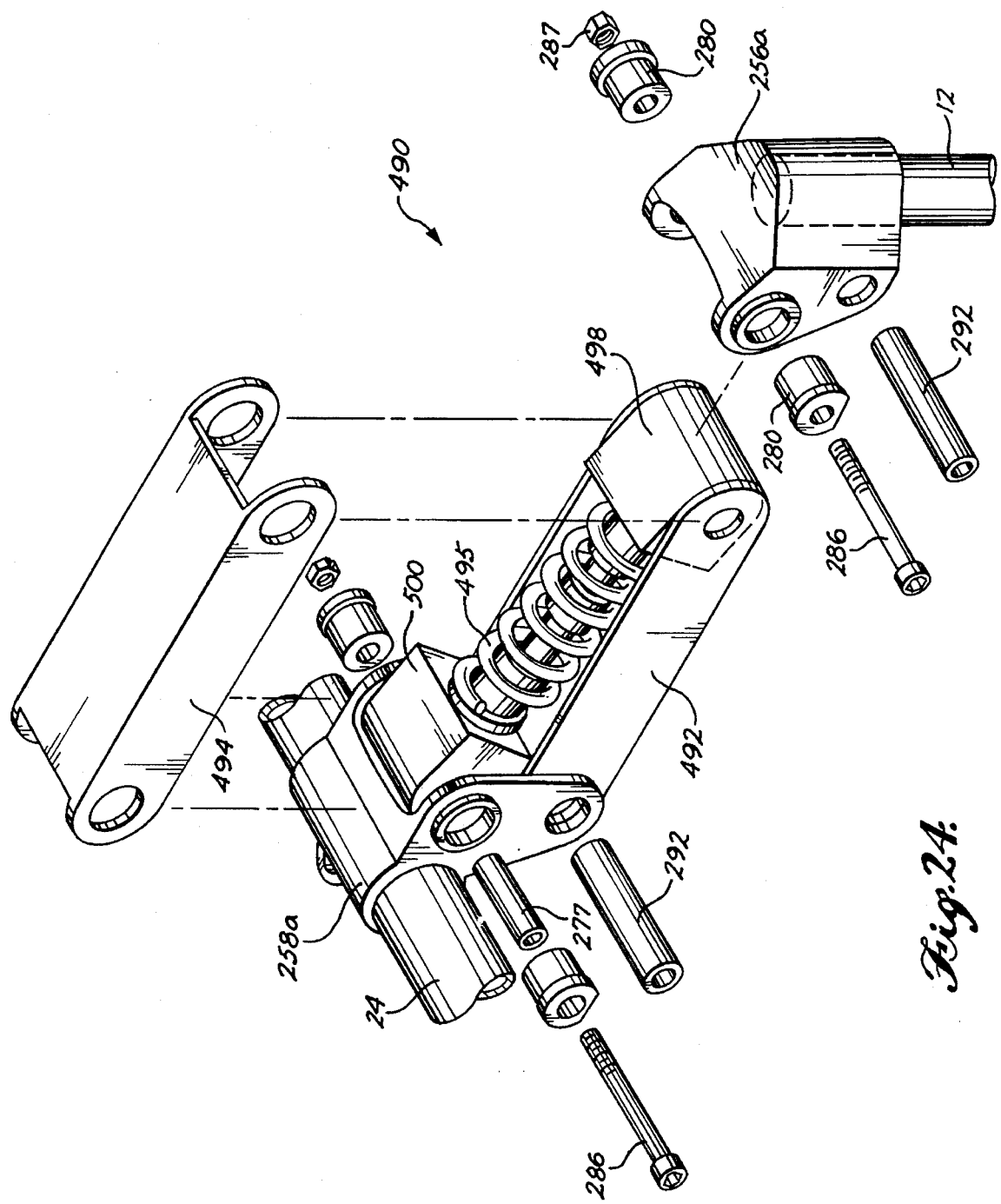
FIG. 24 is an exploded view of an alternative embodiment of this invention.
Figure 25:
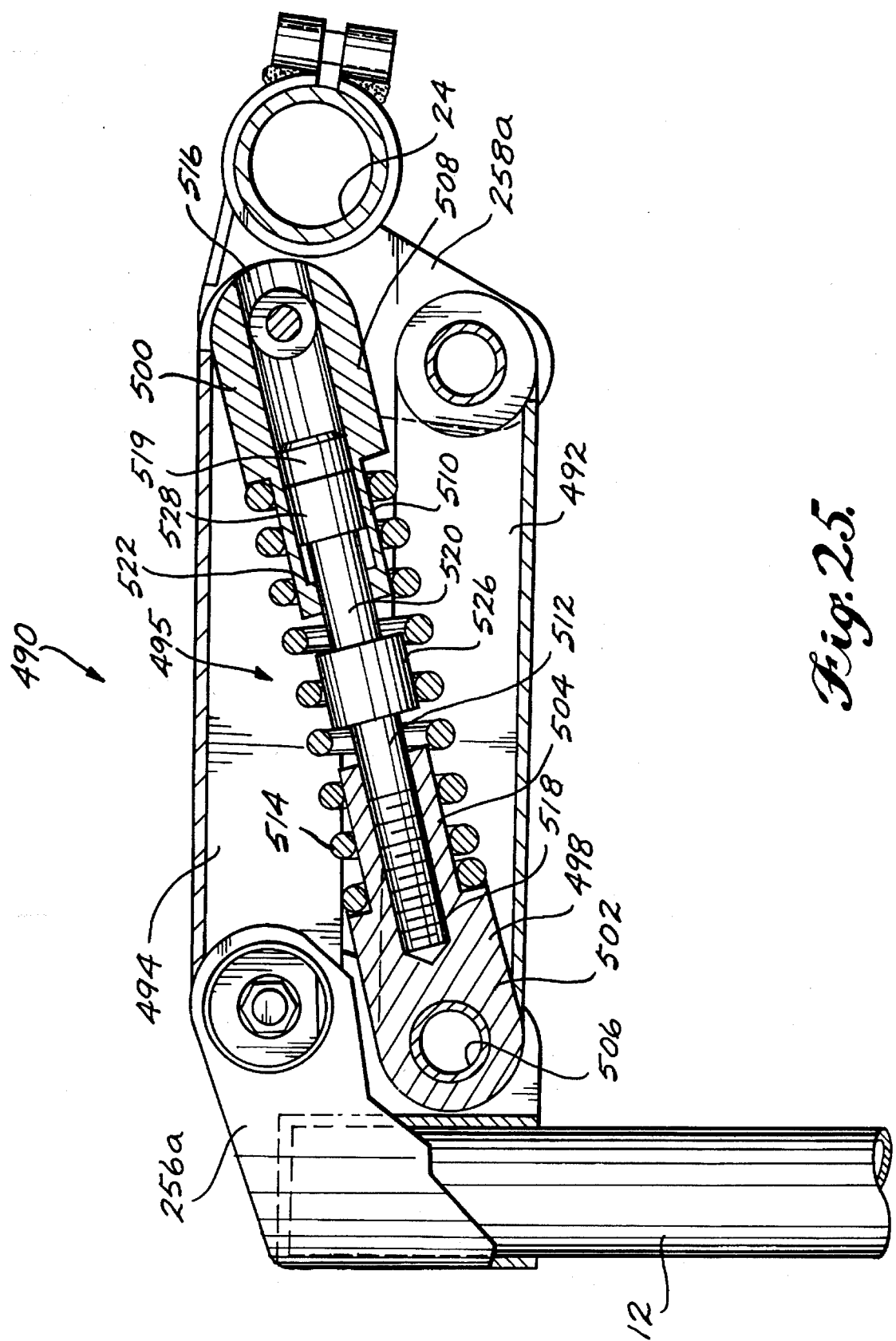
FIG. 25 is a cutaway view of the embodiment of the invention of FIG. 24.

FIGS. 24 and 25 illustrate another handlebar assembly 490 of this invention. Handlebar assembly 490 includes a mounting block 256a and a handlebar clamp 258a similar to those described with respect to the version of the invention depicted by FIG. 10. A lower linkage member 492 and an upper linkage member 494 are both pivotally attached to the mounting block 256a and the handlebar clamp 258a. Downward movement of handlebar assembly 490 is damped and upward movement of the assembly is limited by a coupling assembly 495 that extends between the end of the lower linkage member 492 attached to the mounting block 256a and the end of the upper linkage member 494 attached to the handlebar clamp 258a. Coupling assembly 495 also limits the downward movement of the handlebar assembly 490 and of the handlebars 24 (FIG. 1) attached thereto.

Each linkage member 492 and 494 comprises a single piece of metal shaped to have three walls, a base and two spaced-apart sidewalls that extend outward from the base to give the member a generally U-shaped profile. The linkage members 492 and 494 are arranged so their open ends are adjacent each other. The previously described pins 292 (FIG. 13B) or other suitable means may be used to pivotally couple the linkage members 492 and 494 to the mounting block 256a and the handlebar clamp 258a. The sides of the linkage members 492 and 494 are formed with openings (not identified) to facilitate the insertion of pivot pins therethrough.

Coupling assembly 495 includes a first spring seat 498 adjacent the mounting block 256a and a second spring seat 500 adjacent the handlebar clamp 258a. Both spring seats 498 and 500 are formed of metal or plastic. The first spring seat 498 has a relatively wide, generally rectangular base 502 from which a small, cylindrical boss 504 extends longitudinally outward. A laterally extending opening 506 is formed in the end of base 502 distal from boss 504 to facilitate the pivotal mounting of the first spring seat 498 to the mounting block 256a by the same pivot pin that couples the lower linkage member 492 to the mounting block. The end of the base 502 adjacent the opening 506 has a semi-circular profile to maximize the sweep of first spring seat 498 about the mounting block 256a. The second spring seat 500 has a base 508 and a boss 510 that are substantially identical to those elements described with respect to the first spring seat 498. Base 508 is formed with a laterally extending opening distal from boss 510 to facilitate the pivotal mounting of the second spring seat 500 to the handlebar clamp 258a.

Spring seats 498 and 500 are connected together by a bolt 512 and urged apart by a spring 514. Bolt 512 extends through an axial bore 516 that extends completely through the second spring seat 500 and is coupled into an axial bore 518 that extends only partially through the first spring seat 492. Bolt 512 has a head 519 that is seated in bore 516 and a shaft 520 with a threaded tip that adjustably interlocks with complementary threading around bore 518. Boss 506 is formed with an inwardly directed annular lip 522 that serves to define a neck opening (not identified) in the second spring seat 500 that has a smaller diameter than the coaxial bore 516. The annular lip 522 is dimensioned so that second spring seat 500 can travel freely along the length of the bolt 512. Bolthead 519 is formed with a socket space (not illustrated) dimensioned for receiving a complementary fastening tool, such as an Allen wrench, to allow the selective positioning of the bolt 512 in bore 518. A first rubber damping ring 526 is disposed about the bolt shaft 520 between spring seats 498 and 500. A second rubber damping ring 528 is seated around the portion of the shaft 520 disposed in bore 516 between bolthead 519 and the inside of the lip 522. Spring 514 is a coil spring, the opposed ends of which are disposed about the spring seat bosses 504 and 510. Spring 514 has an inner diameter larger than the outer diameter of the first damping ring 528; this prevents the spring from catching on the damping ring when the spring is compressed.

When a downward force is imposed on a set of handlebars 24 (FIG. 1) attached to a bicycle by way of this assembly 490, linkage members 492 and 494 pivot downward to cause a downward, pantograph motion of the handlebars. The opposed spring seats 498 and 500 are urged together to compress spring 514. The compression of spring 514 slows the downward movement of both the linkage members 492 and the handlebars 494. If the linkage members 492 and 494 pivot downward a sufficient degree, their movement, and the movement of the handlebars 24, will be stopped by the compression of the first damping ring 526 between the spring seats 498 and 500. The compressible properties of damping ring 526 serve to slow the rate at which the linkage members 492 and 494 decelerate to minimize the physical shock of the stop to which a cyclist would otherwise be exposed.

Upon release of the downward force on the handlebars 24, spring 514 expands to its static position to cause upward movement of the linkage members 492 and 494 and the handlebars. The upward movement of the handlebar assembly 490 and the handlebars 24 is stopped by the compression of the second damping ring 528 between the bolthead 519 and the annular lip 522 of boss 510. Since damping ring 528 is initially compressed before the second spring seat 500 comes to a complete stop, the cyclist is not subjected to a significant mechanical shock as a consequence of the handlebars 24 reaching their upwardmost position.

Figure 26:
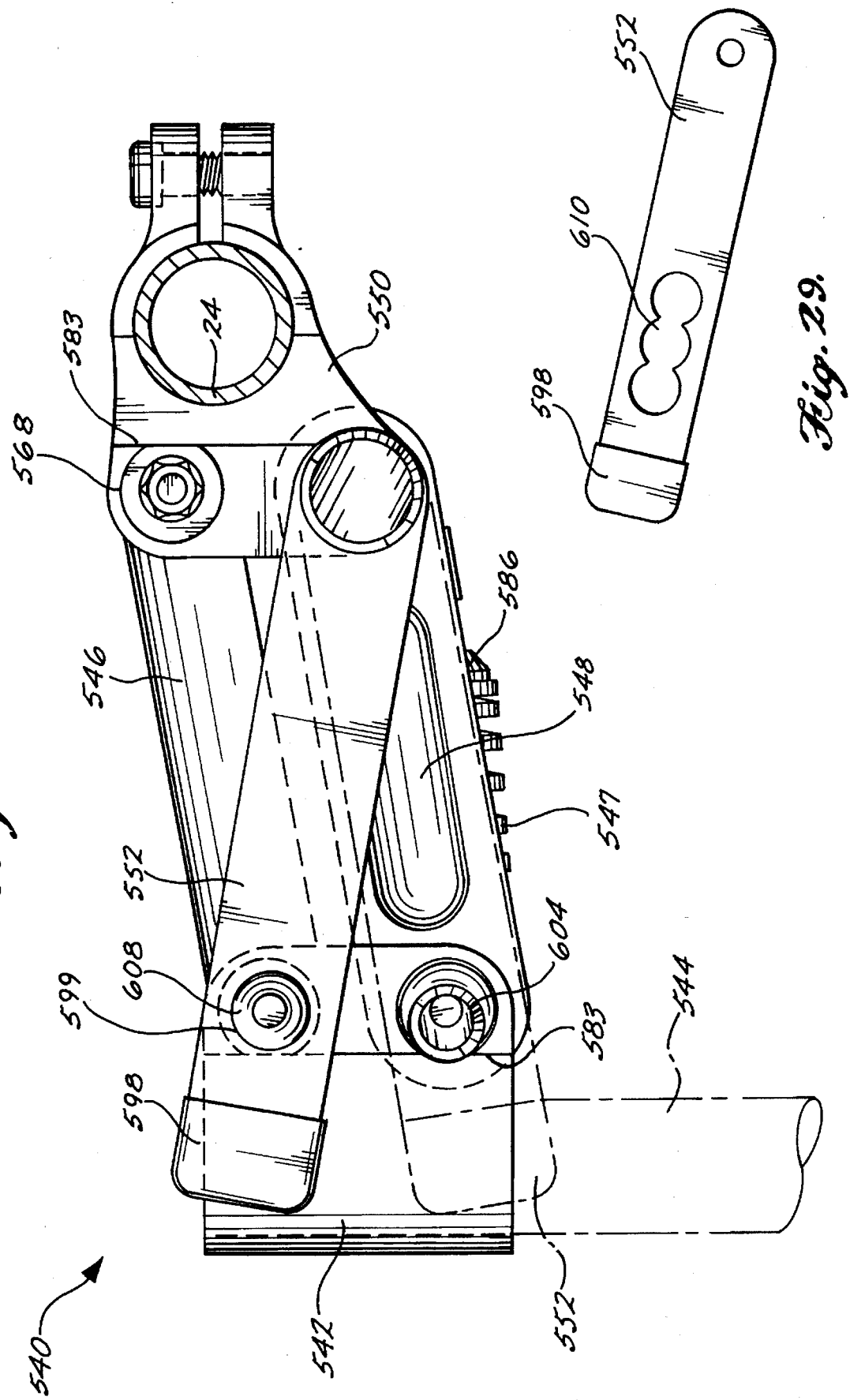
FIG. 26 is a side view of another embodiment of the shock-absorbing handlebar invention wherein the depicted version includes a lockout arm that can be used to selectively lockout the shock-absorbing capabilities of the assembly.
Figure 27:
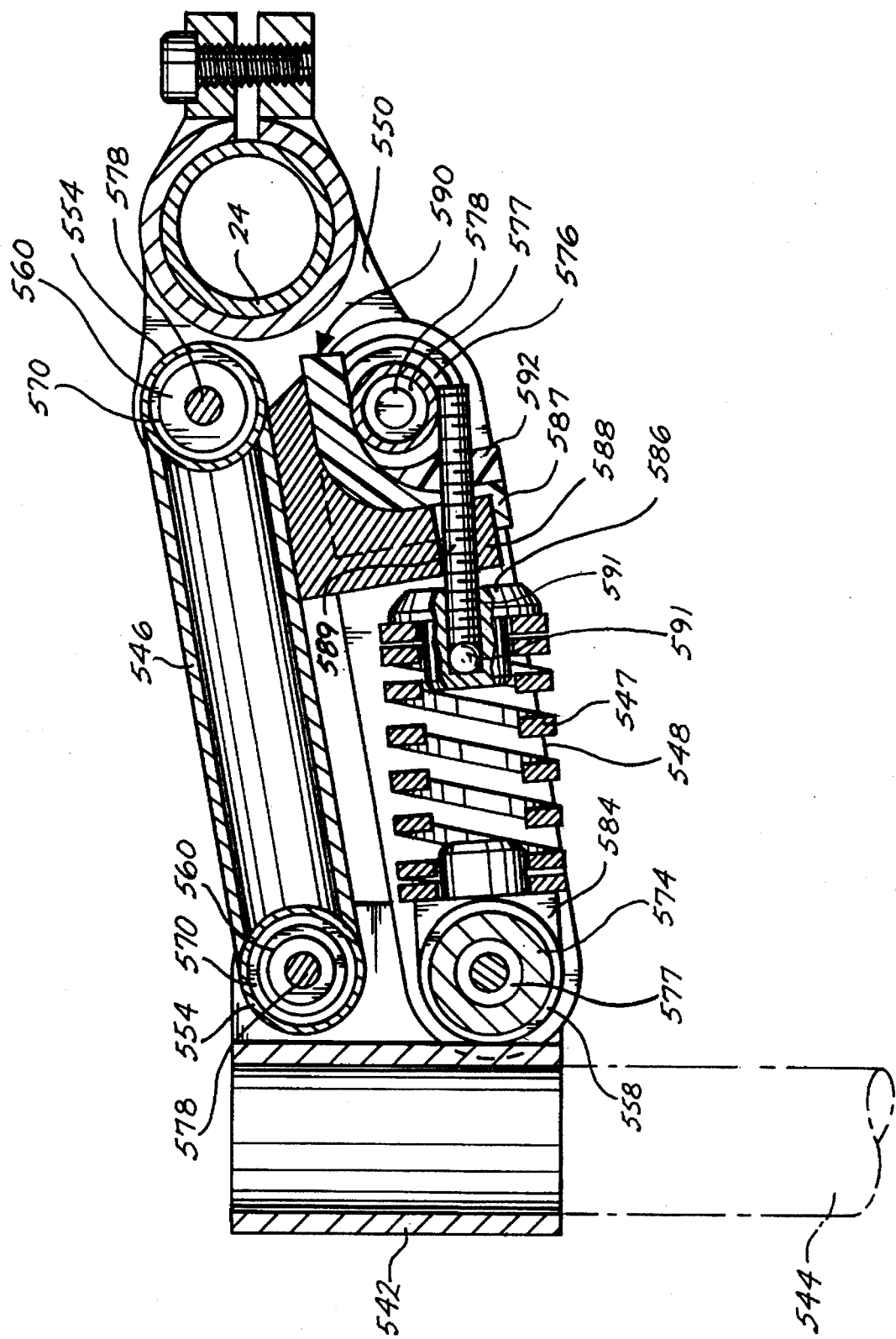
FIG. 27 is a cross-sectional view of the invention of FIG. 26.

An alternative handlebar assembly 540 that can be selectively placed in and out of the shock-absorbing mode is depicted in FIGS. 26–28. Handlebar assembly 540 includes a mounting block, head unit 542 that is attached to a stem, quill 544, that is coupled to the front fork of the bicycle with which the assembly 540 is used. Assembly 540 includes a single upper linkage member 546. A pair of parallel, spaced-apart, lower linkage arms 548 serve as a lower linkage member. The upper linkage member 546 and the linkage arms 548 are pivotally connected at one end to the head unit 542. The distal, forward, ends of the upper linkage member 546 and linkage arms 548 are pivotally connected to a handlebar clamp 550 to which the handlebars 24 are secured. A spring 547 that extends between the head unit 542 and the handlebar clamp 550 damps the downward movement of the linkage elements 546 and 548. A lockout arm 552 is pivotally connected to the forward end of one of the linkage arms 548. The free end of the lockout arm 552 can be selectively coupled to the end of the upper linkage member 546 attached to the head unit 542 to prevent the pivoting of assembly 540 to lock out, restrict, its shock-absorbing capabilities.

Linkage member 546 is in the form of a hollow, elongated body with a generally oval profile. A pair of tubular sleeves 554 are secured across the opposed ends of the upper linkage member 546 such that their axes extend laterally across the linkage member. Linkage arms 548 are in the form of elongated oval bars that are formed with openings 556 to facilitate the mounting of the arms to the head unit 542 and handlebar clamp 550 as will be described hereinafter. The linkage arms 548 are formed with circular flanges 558 located around the openings 556 and that extend inward such that the flanges on the opposed surfaces of the linkage arms are directed toward each other.

Linkage member 546 and linkage arms 548 are secured to the head unit 542 and handlebar clamp 550 by a set of metallic bearing pins 560 and 561. Specifically, a first pair of bearing pins 560 extend through openings 562 formed in a forward directed head unit flange 564 and into the adjacent linkage member sleeve 554. A second pair of bearing pins 560 extend through openings 566, formed in a rearward directed handlebar clamp flange 568 into the forward located linkage member sleeve 554. A first pair of bearing pins 561 are seated in a second pair of openings 562 formed in the head unit flanges 564 and a second pair of bearing pins 561 are seated in a second pair of openings 566 formed in the handlebar clamp flanges 568. Tubular-shaped pivot bushings 570, which are seated in the linkage member sleeves 554 and in the openings 556 formed in the ends of the lower linkage arms 548, provide a low-friction interface between the bearing pins 560 and 561 and the linkage members to which they are connected. The bushings 570 are formed of plastic and are shaped to have annular lips 572 around their outer edges to facilitate their proper seating in the openings in which they are disposed. In one version of the invention, bushings 570 are shaped so that they define bores, having diameters slightly less than the diameters of the head unit openings 562 and handlebar clamp openings 566 with which they are associated. In order to facilitate a snug fit of the bearing pins 560 and 561, the pins are formed with relatively large-diameter outer sections and smaller diameter inner sections, individual sections not identified.

Bearing pins 560, the bearing pins that secure the upper linkage member 546 to the head unit 542 and the handlebar clamp 550, simply face each other in the upper linkage member sleeves 554 in which they are seated. The bearing pins 561 that secure the lower linkage arms 548 to the head unit 542 are seated in a head unit sleeve 574. The bearing pins 561 that secure the lower linkage arms 548 to the handlebar clamp 550 are seated in a handlebar clamp sleeve 576. The head unit sleeve 574 is a ring-shaped member that is located between the adjacent linkage arm flanges 558. Handlebar clamp sleeve 576 is a metallic spool-shaped sleeve that is located between the linkage arm flanges 558. To facilitate the mating of the bearing pins 561 to the head unit and handlebar clamp sleeves 574 and 576, respectively, and to hold the sleeves in place, the bearing pins 561 are formed with small diameter ring-shaped extensions 577. It is the ring-shaped extensions 577 that are actually seated in the head unit and handlebar clamp sleeves 574 and 576, respectively.

Bearing pins 560 and 561 are held in place by a set of bearing bolts 578. The bolts 578 have heads 579 that have a diameter such that they can freely rotate inside the bearing pins 560 and 561. The bearing bolt 578 that secures the upper linkage member 546 to the handlebar clamp 550 is held in position by a conventional hex nut 580, which is seated in the bearing pin 560, opposite the pin in which the bolthead 579 is seated. The hex nut 580 fits snugly in the bearing pin 560 in which it is seated. The other three bearing bolts 578 are held in place by custom nuts that will be described hereinafter. The heads 579 of the bearing bolts 578 are provided with openings (not illustrated) to facilitate their rotation by Allen wrenches or other appropriate fastening tool. To prevent the bearing pins 560 and 561 from rotating and, in turn, unscrewing the bearing bolts 578, the pins are formed with outwardly extending lips 581 around their outer surfaces. The lips 581 define cuts 582 that abut steps 583 formed in the head unit and handlebar clamp flanges 564 and 568, respectively, to block movement of the bearing pins 560 and 561.

Spring 547 is mounted to the head unit 542 by a spring seat 584 that is seated over the head unit sleeve 574. The opposed end of spring 547 is coupled to a spring stop 586 that is attached to a bracket 588 mounted to the forward end of the upper linkage member 546. Bracket 588 is a generally L-shaped bracket that is secured to the upper linkage member 546 by welding or other suitable means. Spring stop 586 is coupled to bracket 588 by an adjustable tension screw 589. In some versions of the invention, tension screw 589 is not threadably secured to the spring stop 586. Rather, spring stop 586 is formed with a center bore 591 that has a diameter larger than that of the tension screw 589. Bore 591 may even have a slightly outwardly tapered profile. Inside the base of the bore 591 is a roller beating 593. The tip of the tension screw 589 abuts the roller beating 593. The roller beating 593 functions as a low-friction interface between the spring stop 586 and the tension screw 589 that allows the spring stop to rotate without causing a loosening motion in the screw.

A rubber up-stop 590 is fitted over the outer surface of the bracket 588. The up-stop 590 is generally L-shaped such that it has a boot section 587 that fits over the downwardly extending portion of the bracket 588 and a tongue 583 section that is generally parallel to the portion of the bracket that extends toward the handlebar clamp 550. The up-stop 590 is provided with an opening (not identified) to facilitate the securing of the tension screw 589 to the bracket 588. In some versions of the invention, the up-stop 590 is the actual part of the bracket assembly that contacts the handlebar clamp sleeve and adjacent linkage arm flanges 558 to limit the upward movement of the handlebar assembly 540. Other versions of the invention are provided with a damping member 592 that is located adjacent the boot section 587 of the up-stop 590. The damping member 592 prevents shimming of the tension screw 589 and further serves as the member that abuts the adjacent linkage arm flanges 558 to stop the movement of the assembly 540.

Lockout arm 552 is in the form of an elongated, flexible flat metal bar. One end of the lockout arm 552 is pivotally attached to one of the linkage arms 548. The free end of the lockout arm is releasably attached to the upper linkage member 546, and is provided with a small rubber-coated handle 598 to facilitate its movement. The free end of the lockout arm 552 is also formed -with an opening 599 to facilitate its positioning as will be described below. The lockout arm 552 is secured to the linkage arm 548 by a flathead nut 600 that holds the associated beating bolt 578 in place. The flathead nut 600 has a lower base section shaped like a conventional nut and a disk-shaped head. The lockout arm 552 is sandwiched between two low-friction nonmetallic washers 602, one of which is between the arm and the adjacent bearing pin 561, the other of which is between the arm and the flathead nut 600.

The free end of the lockout 552 arm is normally seated in a neutral position over a button-head nut 604 that is coupled to the beating bolt 578 that holds the lower linkage arms 548 to the head unit 542. If the cyclist wishes to lockout, or inhibit the shock-absorbing capabilities of the lockout assembly 540, the lockout arm 552 is shifted and seated over a button-head nut 608 that is coupled to the bearing bolt 578 that secures the upper linkage member 546 to the head unit 542. The button-head nuts 604 and 608 are each formed with conventional nut bodies and protuberances that are dimensioned to extend away from the beating pins 560 and 561 in which the nuts are seated. Button-head nut 604 is dimensioned to be significantly smaller in diameter than the lockout arm opening 599 in which the nut is disposed. This allows the lockout arm 552, as well as the rest of the handlebar assembly 540, to freely pivot in response to the vibrations to which the associated bicycle may be exposed. The protruding portion of button-head nut 608 has a diameter selected so that the nut fits snugly in the lockout arm opening 599. When the lockout arm is fitted over the button-head nut 606, the lockout arm 552 prevents the pivoting movement of the linkage elements 546 and 548.

The shock-absorbing assembly 540 of this embodiment of the invention damps the front-end vibrations to which the cyclist will otherwise be exposed in a manner similar to that described with respect to the other embodiments of this invention. Whenever the cyclist is exposed to a downward moving force, the linkage elements 546 and 548 pivot downward and the compression of the spring 547 absorbs the shock of the resultant motion. After the force is released, the spring 547 forces the linkage members 546 and 548 upward until the movement is blocked by the action of the up-stop 590 abutting the linkage arm flanges 558 and the handlebar clamp sleeve 576. Since the spring stop 586 is not securely fastened to the associated tension screw 589, the rotation of the stop, which inherently occurs as a result of the repeated compression and expansion of the spring, does not cause a like loosening rotation of the screw, which could cause change in the tension on the spring or the stop to fall out of position. Still another feature of this invention is that the handlebar clamp 550 can be fastened "upside-down" to the linkage elements 546 and 548. This allows the cyclist a choice in setting the position of the handlebars.

Another feature of the assembly of this invention is that by selectively positioning the lockout arm 552, the cyclist can block out or inhibit the shock-absorbing capabilities of the assembly as desired. Thus, for example, when during the course of a ride, the cyclist decides it is desirable to push off the handlebars to maximize the force applied to the pedals, all that he needs to do is to pivot the lockout arm 552 from the neutral position to the lockout position over button-head nut 608. The lockout arm 552, once engaged in this position, prevents the linkage members 546 and 548 from pivoting. The cyclist can then push off the handlebars 24 to increase the energy applied to the pedals. When the extra force is no longer desired, the cyclist can easily return the assembly 540 to its normal shock-absorbing mode of operation by simply moving the lockout arm 552 from the lockout position to the neutral position over button-head nut 604. Since the lockout arm handle 598 faces the cyclist, relatively little mental effort or time is needed to shift the assembly from its normal mode of operation to the lockout mode.

Figure 31:
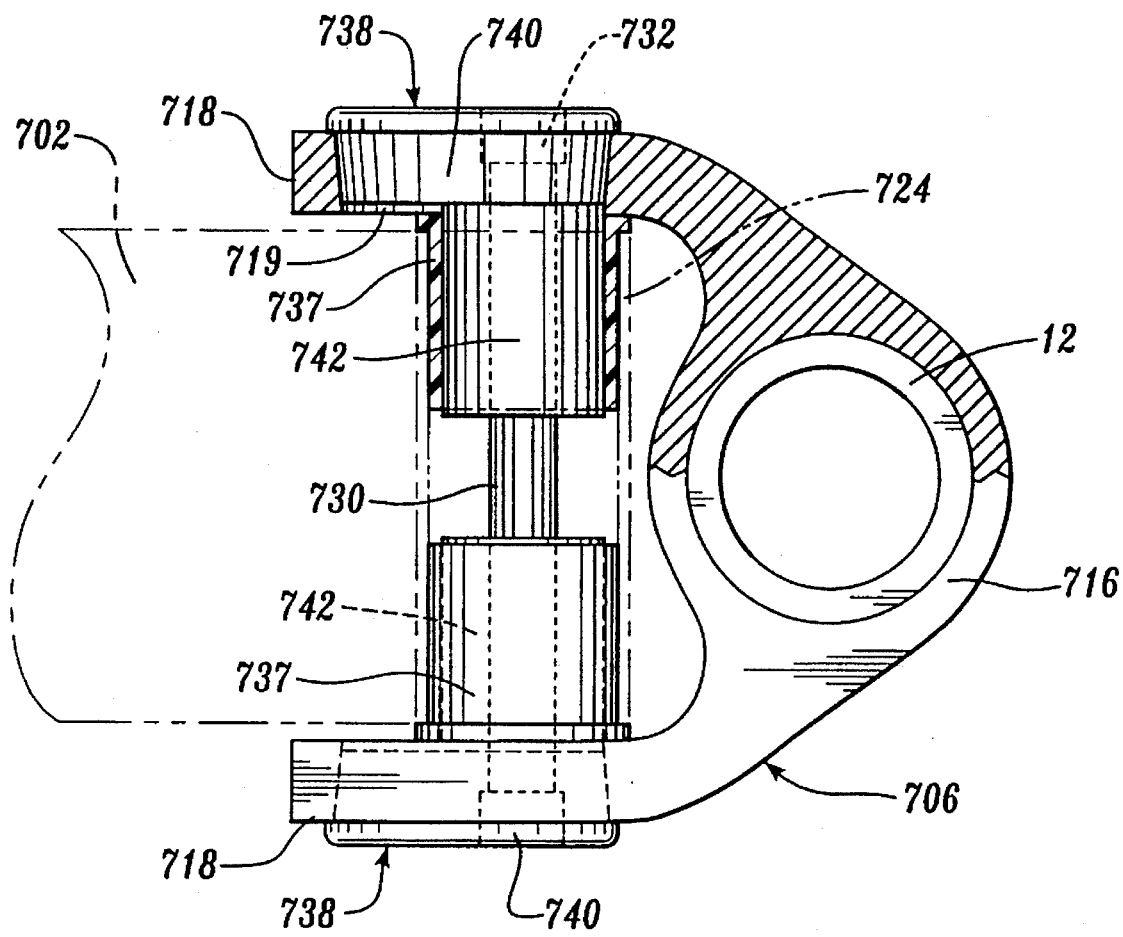
FIG. 31 is a top, partial cutaway view of the bearing pins within the head unit of the embodiment of FIG. 30.

Another alternate embodiment of the invention will now be discussed with reference to FIGS. 30–32. A handlebar support assembly 700 is provided that is adjustable to raise or lower the position of the handlebar. Support assembly 700 is similar in most respects to the embodiment illustrated in FIG. 18 and discussed above, except for the provision of an eccentric bearing pin 738 and an adapted head pivot unit 706 to secure upper linkage member 702.

Specifically, support assembly 700 includes an upper linkage member 702 (a first linkage member), a pair of spaced-apart, parallel lower linkage members 704, head pivot unit 706, and a handlebar clamp 708. A spring 710 (shown in FIGS. 32A–C) extends between lower linkage members 704 and is operatively connected between upper linkage member 702 and lower linkage members 704 to bias handlebar clamp 708 to an upwardmost position. Spring 710 extends between a down-stop 712 pivotally mounted to head pivot unit 706 and an up-stop assembly 714 (a first stop member) fixedly attached to upper linkage member 702.

Head pivot unit 706 consists of a tubular female adapter 716 secured, in use, to stem 12 of the head of the bicycle. A pair of parallel mounting flanges 718 project integrally from either side of adapter 716 toward linkage members 702 and 704. The planar surfaces of mounting flanges 718 are also parallel to the axis of stem 12. Each flange 718 includes an upper mounting hole 719 and a lower mounting hole 721. Upper mounting holes 719 are laterally aligned, as are lower mounting holes 721, such that fasteners may be secured through them as explained below. The diameter of upper mounting hole 719 is preferably somewhat larger than that of lower mounting hole 721. The diameter of upper mounting hole 719 tapers inwardly.

Handlebar clamp 708 is substantially similar to that illustrated in FIG. 18. Clamp 708 includes a main body 720, a pair of parallel, spaced-apart flanges 722, and openings (not identified) to facilitate the coupling of hardware for mounting the linkage members 702 and 704 thereto.

Upper and lower linkage members 702 and 704 are also substantially similar to those shown in FIG. 18 and discussed above. Upper linkage member 702 is tubular with an oval cross section fixedly attached at the ends to mounting sleeves 724. Mounting sleeves 724 are cylindrical and have longitudinal axes transverse to the longitudinal axis of upper linkage member 702, preferably perpendicular to stem 12. Preferably, plastic bearing sleeves 737 are fitted within both ends of mounting sleeves 724. Bearing sleeves 737 are cylindrical and have small outer flanges.

Lower linkage members 704 are bars with rectangular cross sections, preferably the same length as upper linkage 702, that extend beneath upper linkage 702. Lower linkage members 704 have holes at their rearward ends for pivotal attachment to lower mounting holes 721 on head pivot unit 706. Bearing sleeves 739 are fitted through the rearward holes in linkage members 704. Bearing sleeves 739 are similar to those fitted within mounting sleeves 724. The forward ends of lower linkage members 704 are pivotally attached to handlebar clamp 708. Support assembly 700 is arranged so that both upper and lower linkage members 702 and 704 are mounted between head unit flanges 718 and handlebar clamp flanges 722.

Lower linkage members 704 are attached to head pivot unit 706 with a bolt 730, extending through bushings 735 and 736, and secured with a nut 732. Bushings 735 and 736 extend through flanges 718 and into bearing sleeves 739. Bolt 730 is threaded at one end to engage nut 732 and includes a head at the opposite end with a hexagonal recess. Bushings 735 and 736 are generally cylindrical with flanges on their outer ends. Bushings 735 and 736 fit within lower mounting holes 721. Bushing 735 includes a recess within the outer end of the flange to receive the head of bolt 730. Bushing 736 includes a hexagonal recess to engagingly receive nut 732 and prevent it from rotating. Lower bolt 730 extends through bushing 735 within lower mounting hole 721, left lower linkage member 704, bearing sleeves 739 within downstop 712, right lower linkage member 704, and bushing 736 to engage with nut 732.

Upper linkage member 702 is pivotally secured to head pivot unit 706 by engagement of rearward mounting sleeve 724 with bearing pins 738. Bearing pins 738 include pinheads 740, pin cylinders 742, bores 744, and recesses 746. Pinheads 740 are disc shaped with a major portion of their outer edge being tapered inwardly (FIG. 31). The outer portions of pinheads 740 are preferably equal in diameter to the largest part of the tapered portions. The thickness of pinheads 740 is slightly greater than that of mounting flanges 718 with the tapered portion being slightly narrower than mounting flanges 718. The diameter of pinheads 740 is such that the tapered portions engage within tapered upper mounting holes 719.

Pinheads 740 preferably have circular cross sections. However, they alternatively may be other geometric shapes that are movable within matching bores 744 into at least two positions for adjustment purposes. Providing disc-shaped pinheads 740 is preferred since such an arrangement allows for infinitely small adjustments.

Pin cylinders 742 are substantially smaller in diameter than pinheads 740 and are eccentrically affixed to the inner surfaces of pinheads 740 such that the longitudinal axes of pin cylinders 742 are parallel to the center axes of pinheads 740. The eccentric arrangement of pin cylinders 742 relative to pinheads 740 allows pin cylinders 742 to be oriented within upper mounting holes 719 in an infinite number of positions by rotating pinheads 740 within mounting holes 719.

Bores 744 for receiving upper bolts 730 extend concentrically through pin cylinders 742 and continue eccentrically through pinheads 740. Alternatively, bores 744 could extend eccentrically through pin cylinders 742 and concentrically through pinheads 740. Pinheads 740 also include recesses 746, similar to the recesses described above within bushings 735 and 736, for holding the head of bolt 730 and engaging upper nut 732.

Rearward mounting sleeve 724 is pivotally attached to pin cylinders 742 with bearing sleeves 737 between rearward mounting sleeve 724 and pin cylinders 742. By varying the position of pin cylinders 742 the angle (or rise) of linkage members 702 and 704 can be varied in infinitely small increments to position the height of the handlebar exactly as preferred by the rider. For example, the rider may wish to slightly lower the handlebar for improved aerodynamics, or the rider may prefer a more upright riding position afforded by a raised handlebar for offroad riding.

Figure 32A:
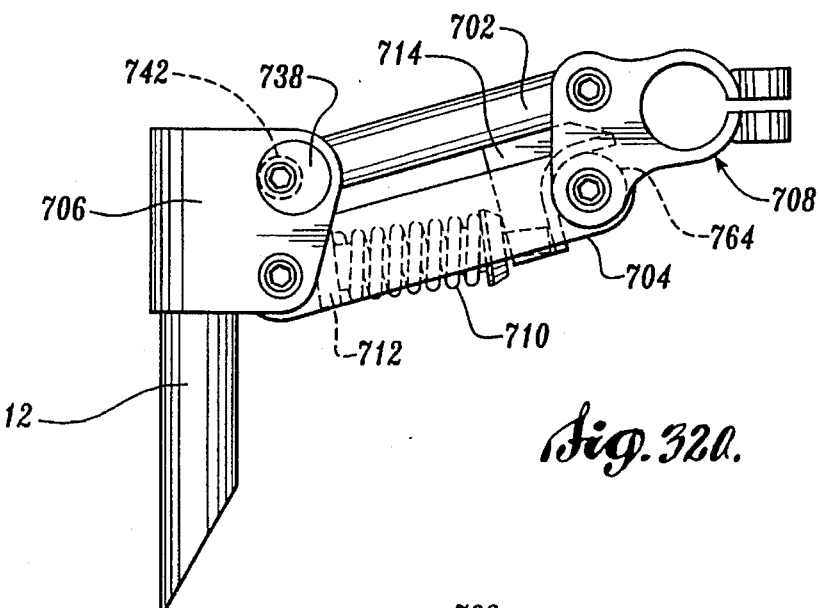
FIGS. 32A–C are side elevational views illustrating three positions of the handlebar clamp obtained by moving the bearing pin of the embodiment of FIG. 30.
Figure 32B:
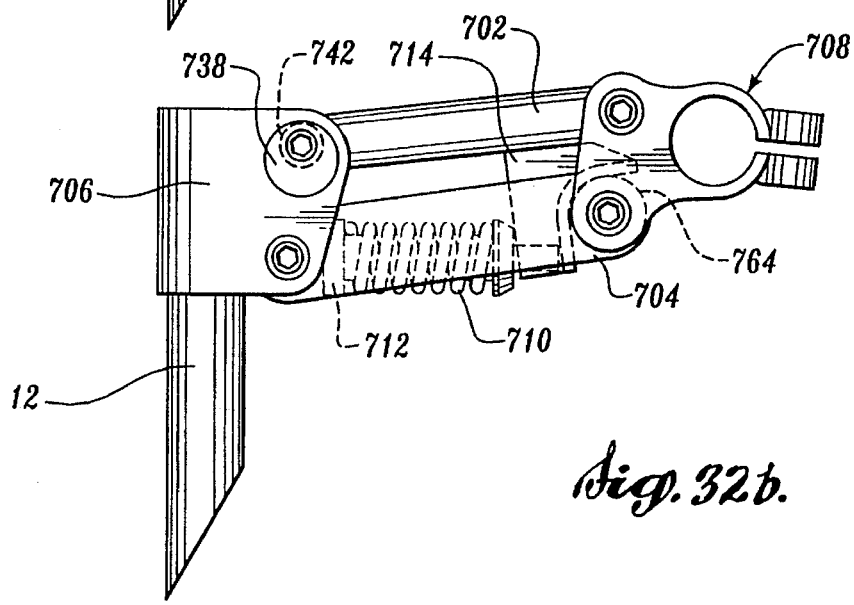
Figure 32C:
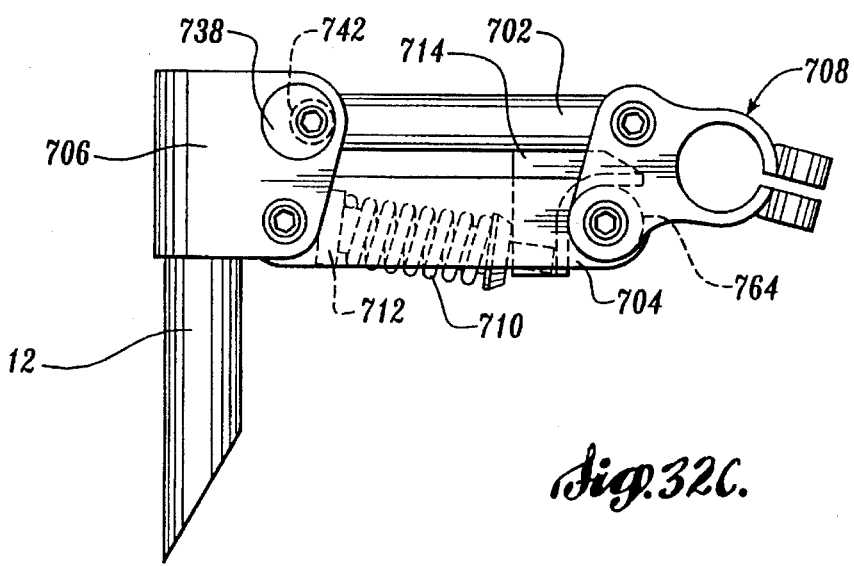

FIGS. 32A–C illustrate three positions obtainable by orienting pin cylinder 742 rearward, upward, and forward. The greatest rise is obtainable by orienting pin cylinder 742 rearwardly such that linkage members 702 and 704 are angled upwardly.

An intermediate position, illustrated in FIG. 32B is obtainable by positioning pin cylinder 742 between extreme rearward and extreme forward positions. Note that with pin cylinder in the upward position upper linkage member 702 is no longer parallel to lower linkage members 704. However, the angle between linkages 702 and 704 is so slight that very little rotation of handlebar clamp 708 occurs when a shock is absorbed and spring 710 is depressed. In the upward configuration illustrated in FIG. 32B the handlebar would only slightly rotate back as the handlebar moves downwardly relative to stem 12.

The lowest position of handlebar clamp 708 is obtained with pin cylinder 742 in a forward orientation. Note that in all three of the above-described positions the spring depression or preload does not change. Linkages 702 and 704, along with handlebar clamp 708, simply move together with upstop 714 abutting sleeve 764 (a second stop member) in a static position.

As mentioned above, the microadjustability of the handlebar height allows the rider to set a preferential height independent of stem adjustment. Stem adjustment may also be used in combination with the linkage adjustment, described herein, to further increase the range of adjustment. However, the adjustability of the support assembly makes precise changes quick and easy. The upper bolt simply needs to be loosened, the pinhead rotated, for example, by applying a downward or upward force on handlebar clamp 708 and/or upper linkage member 702 until in the desired position, and upper bolt 730 retightened. Tapered pinhead 740 securely locks pin cylinder 742 into position relative to head pivot unit 706.

The foregoing description is for the purpose of illustration only. Alternative embodiments of this invention are possible without departing from the scope of the claims. For example, the depiction of the multiple openings 94 at the tail end of the linkage members in the embodiment of FIG. 4 and the use of the slides 170 in the embodiment illustrated in FIG. 8 are meant to be merely exemplary of how the adjustable handlebar assembly of this invention can be provided. Clearly, these features of the invention can be used with the other embodiments of the invention, and can be used together. Moreover, while the application discloses the use of elastomeric material and leaf springs to damp the downward movement of the linkage members, these disclosures should by no means be considered limiting. For example, there may be instances where it is desirable to place one or more coil springs between the upper and lower linkage members to damp both the downward and upward movement of the assembly.

It should further be understood that the various fastening assemblies 278 and 376 and pivot pins 292 used to secure the linkage members to the mounting blocks and/or handlebar clamps can be used with assemblies other than the ones with which they were described in this specification. Moreover, fastening assemblies 278 and 376 of this invention provide lightweight couplings that are formed from a minimal amount of parts that can readily be assembled and disassembled, and are not unduly affected by normal environmental exposure. Thus, there may be instances when it is desirable to use these assemblies 278 and 376 with other than the disclosed handlebar assemblies.

Some embodiments of the invention may include a spring unit located within the bicycle front fork assembly for damping the downward movement of the handlebar assembly. These assemblies may take the form of a set of bell-shaped washers that are connected to the upper linkage member by a cable. The downward movement of the assembly would serve to compress the springs so that the springs contribute to the damping of the movement and the absorption of the downward force. Upon release of the downward force, the springs would return to their original state to cause the upper and lower linkage members to likewise return to their static state. These washers could further be provided with a set of bell-shaped washers, which are oriented upward so that, when the linkage members are urged downward, the curved washers offer minimal resistance and, when the springs start to return the linkage member to the static state, the washers offer substantially more resistance to damp the upward movement. Also, it should be noted that, in FIGS. 1–3, the lower linkage member 20 is shown as being pivotally connected to the mounting block 16 in front of the front fork assembly stem 12; in the other embodiments of the invention the lower linkage members are shown pivotally connected behind the stem. Neither of these depictions is intended as limiting. In fact, in other embodiments of the invention it may be desirable to attach the upper linkage member to the bicycle so that it is located forward of the front fork assembly stem 12. Moreover, assemblies other than those disclosed in FIGS. 9A and 9B may be used to attach the speedometer processing unit to the handlebar assembly of this invention. For instance, it may be desirable to arrange the fasteners that are used to secure the cover of the speedometer processing unit 222 so that they can be accessed only from the underside of the upper linkage member. This would make it difficult for unauthorized persons to access the fasteners in order to remove the cover. Furthermore, it should also be clear that the speedometer can be installed into the upper linkage members of other embodiments of this invention.

Also, while the upper and lower linkage members have been generally shown as being parallel to each other, it should be understood that this is simply for purpose of illustration and should not be construed as limiting. In other embodiments of the invention, it may be desirable to design the assembly so that the linkage members are not so aligned. Moreover, the fact that in the illustrated embodiments of the invention the upper and lower linkage members are shown as having generally identical lengths should not be considered limiting. An advantage of having identical-length linkage members is that the assemblies and the handlebars to which they are attached will move in a linear path. In other embodiments of the invention, it may be desirable to arrange the linkage members so that there is a slight curvature in the movement of the handlebar clamp and the handlebars attached thereto. This can be accomplished by providing the handlebar assembly with upper and lower linkage members that are of uneven length.

It should also be recognized that the lockout arm 552 used to shift the handlebar assembly in and out of the shock-absorbing mode of operation can be used in other versions of the invention, different from the one with which it is shown. In a similar vein, it should be recognized that there is no requirement that the lockout arm 52 always be pivotally secured to one of the linkage arms 548 that serve as the lower linkage member or that when in the lockout mode, it be secured to the upper linkage member 546. In some versions of the invention it may be desirable to pivotally secure the lockout arm 552 to the upper linkage member 546, the mounting block 542, or even directly to the handlebar clamp 550. It is further possible to construct the assembly so that the lockout arm prevents the linkage members from moving when it is coupled to the arms 548 that function as the lower linkage member, the mounting block 542, or the handlebar clamp 550. Furthermore, it may be desirable to provide the lockout arm 552 with multiple openings 610 as depicted in FIG. 29. Alternatively, the assembly could be provided with multiple stop members 608 for securing the lockout arm 552 in the lockout mode. An advantage of these versions of the assembly is that they make it possible to lock out the movement of the linkage members in a number of different static positions. Thus, the cyclist could then lock out the handlebars in one of a number of different positions in order to gain the advantages or comfort of the selected position.

Therefore, it is the objective of the appended claims to cover all such variations and modifications as may come within the true spirit and scope of the invention.

The embodiments of the invention in which an exclusive property or privilege is claimed are defined as follows:

1. A bicycle handlebar support assembly for interconnection between a handlebar and a front fork assembly, the support assembly comprising:
    (a) a head unit adapted to be secured to the front fork assembly;
    (b) a first linkage member having a front end, and a tail end wherein said tail end is pivotally attached to said head unit;
    (c) handlebar clamp means for mounting the handlebar attached to the front end of said first linkage member;
    (d) a biasing means, coupled to said first linkage member, for upwardly biasing said handlebar clamp means; and
    (e) a first bearing pin coupled to said head unit and the tail end of said first linkage, said first bearing pin being adapted for movement relative to said head unit to change the position of said first linkage relative to said head unit, wherein said first bearing pin includes a pinhead engaged within a first bore in said head unit and a first pin extension eccentrically attached to said pinhead, said pin extension extending inwardly from said pinhead to engage the tail end of said first linkage, such that rotation of said pinhead within the bore changes the position of the first pin extension relative to the head unit.

2. The support assembly of claim 1, further comprising a second linkage member having a front end and a tail end disposed adjacent said first linkage member and spaced therefrom, said second linkage member being pivotally attached to said head unit at the tail end and attached to said handlebar clamp means at the front end, said first linkage member, said second linkage member, said head unit, and said handlebar clamp means forming a four-bar linkage assembly such that movement of said bearing pin to change the position of said first linkage member changes the height of said handlebar clamp means relative to said head unit.

3. The support assembly of claim 2, wherein said first linkage member is disposed above said second linkage member.

4. The support assembly of claim 2, wherein said first linkage member is disposed below said second linkage member.

5. The support assembly of claim 2, wherein said pinhead is disc shaped with an outer tapered surface, and wherein the first bore in said head unit is shaped to engage the tapered surface of said pinhead, the assembly further comprising a tightening means for securing said pinhead to said head unit such that the tapered surface of said pinhead is tightly held within the first bore.

6. The support assembly of claim 2, further comprising a second bearing pin coupled to said head unit and the tail end of said first linkage opposite said first bearing pin, said second beating pin being adapted for movement relative to said head unit to change the position of said first linkage relative to said head unit, said second beating pin including a pinhead engaged within a second bore opposite said first bore in said head unit and a second pin extension eccentrically attached to said pinhead, said second pin extension extending inwardly from said pinhead toward said first pin extension to engage the tail end of said first linkage, such that rotation of said pinheads within said bores changes the positions of the pin extensions and thus, the tail end of the first linkage relative to the head unit.

7. A bicycle handlebar support assembly for interconnection between a handlebar and a front fork assembly, the support assembly comprising:
    (a) a head unit adapted to be secured to the front fork assembly;
    (b) an upper linkage member having a front end, and a tail end wherein said tail end is pivotally attached to said head unit;
    (c) a lower linkage member including two laterally spaced-apart longitudinally extending linkage arms located below said upper linkage member and spaced therefrom, wherein said linkage arms are pivotally attached to said head unit;
    (d) handlebar clamp assembly means for mounting the handlebar pivotally attached to said upper linkage member front end, said handlebar clamp assembly also being pivotally attached to said linkage arms;
    (e) a stop assembly including a first stop member secured to said upper linkage member adjacent said linkage arms and a second stop member secured between said linkage arms, wherein said first stop member and said second stop member are positioned so that, when said upper linkage member and said linkage arms of said lower linkage member are moved upwardly, said first stop member abuts said second stop member prior to said linkage arms contacting said upper linkage member;
    (f) a biasing member coupled between one of said linkage members and said head unit; and
    (g) a bearing pin having a pinhead and an eccentrically mounted pin extension projecting inwardly from said pinhead, said pinhead being movably coupled to said head unit and said pin extension being coupled to the tail end of said upper linkage member for pivotally attaching said upper linkage member to said head unit.

8. The support assembly of claim 7, wherein said linkage arms have a downstop member coupled between their tail ends, wherein said biasing member extends between said first stop member and said downstop member.

9. A bicycle handlebar support assembly for interconnection between a handlebar and a front fork assembly, the support assembly comprising:
    (a) a head unit adapted to be secured to the front fork assembly, said head unit including at least one bearing pin having a pinhead and a pin cylinder extending inwardly from said pinhead, said pin cylinder attached eccentrically to said pinhead;
    (b) a first linkage member having a front end and a tail end, wherein said tail end is pivotally attached to said head unit by being coupled to said pin cylinder;
    (c) a second linkage member having a front end and a tail end, wherein said tail end is pivotally attached to said head unit; and
    (d) a handlebar clamp pivotally attached to the front end of said first linkage member and pivotally attached to the front end of said second linkage member.

10. The support assembly of claim 9, wherein said pinhead is disc shaped and includes a tapered outer surface, said head unit including a bore shaped to engage the tapered surface of said pinhead, said bearing pin further including a tightening means for forcing the tapered surface of said pinhead into tight engagement with the bore.

11. The support assembly of claim 9, further including a biasing means coupled to at least one of said linkage members for resisting downward forces on said handlebar clamp relative to said head unit.

12. The support assembly of claim 11, wherein said first linkage member is disposed above said second linkage member.

13. The support assembly of claim 11, wherein said first linkage member is disposed below said second linkage member.

* * * * *

UNITED STATES PATENT AND TRADEMARK OFFICE
CERTIFICATE OF CORRECTION

PATENT NO. : 5,511,444
DATED : April 30, 1996
INVENTOR(S) : E. Clausen et al.

It is certified that error appears in the above-indentified patent and that said Letters Patent is hereby corrected as shown below:

COLUMN     LINE

31             59           "beating" should read --bearing--
(Claim 6,   line 6)

31             61           "beating" should read --bearing--
(Claim 6,   line 8)

Signed and Sealed this

Third Day of September, 1996

Attest:

BRUCE LEHMAN

*Attesting Officer*     Commissioner of Patents and Trademarks